(12) United States Patent
Watanabe et al.

(10) Patent No.: US 11,172,179 B2
(45) Date of Patent: Nov. 9, 2021

(54) PROJECTION SYSTEM

(71) Applicant: NEC CORPORATION, Tokyo (JP)

(72) Inventors: Go Watanabe, Tokyo (JP); Fujio Okumura, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/334,828

(22) PCT Filed: Sep. 15, 2017

(86) PCT No.: PCT/JP2017/033410
§ 371 (c)(1),
(2) Date: Mar. 20, 2019

(87) PCT Pub. No.: WO2018/056194
PCT Pub. Date: Mar. 29, 2018

(65) Prior Publication Data
US 2020/0021786 A1    Jan. 16, 2020

(30) Foreign Application Priority Data

Sep. 21, 2016 (JP) .............................. JP2016-184071

(51) Int. Cl.
*H04N 9/31* (2006.01)
*G03B 21/28* (2006.01)
*G03B 21/60* (2014.01)

(52) U.S. Cl.
CPC .......... *H04N 9/3185* (2013.01); *G03B 21/28* (2013.01); *G03B 21/60* (2013.01); *H04N 9/312* (2013.01); *H04N 9/3147* (2013.01)

(58) Field of Classification Search
CPC .... H04N 9/3185; H04N 9/312; H04N 9/3147; G03B 21/28; G03B 21/60
See application file for complete search history.

(56) References Cited

U.S. PATENT DOCUMENTS 5,548,348 A * 8/1996 Kawabata ............ H04N 5/7441
348/756
9,329,388 B1 * 5/2016 Amirparviz .......... G02B 5/1842
(Continued)

FOREIGN PATENT DOCUMENTS

JP   2007-86545 A    4/2007
JP   2007-174398 A   7/2007
(Continued)

OTHER PUBLICATIONS

International Search Report for PCT/JP2017/033410 dated Dec. 5, 2017 [PCT/ISA/210].
(Continued)

*Primary Examiner* — Michael E Teitelbaum
(74) *Attorney, Agent, or Firm* — Sughrue Mion, PLLC

(57) ABSTRACT

A projection system includes a projector, a controller, and a reflecting mirror in order to project sufficiently bright display information in on a plurality of display areas without distortion. The projector includes a light source, a phase-modulation-type spatial light modulator element, and an optical system. The spatial light modulator element includes a display part displaying a pattern corresponding to the display information, and modulates and emits light radiated on the display part from the light source. The optical system projects modulated light emitted from the spatial light modulator element. The controller generates control conditions for controlling the light source and the spatial light modulator element, based on display conditions acquired from a host system, and controls the light source and the spatial light modulator element, based on the generated control conditions. The reflecting mirror reflects projected light from the projector toward the plurality of display areas.

14 Claims, 33 Drawing Sheets

(56) References Cited

U.S. PATENT DOCUMENTS

| | | | | |
|---|---|---|---|---|
| 2006/0055887 A1* | 3/2006 | Hoshino | ............... | G02B 30/54 353/7 |
| 2012/0002256 A1* | 1/2012 | Lacoste | ............. | G02B 27/0081 359/9 |
| 2013/0307984 A1* | 11/2013 | Pan | ........................ | G09F 23/00 348/148 |

FOREIGN PATENT DOCUMENTS

| | | |
|---|---|---|
| JP | 2008-145613 A | 6/2008 |
| JP | 2009-157263 A | 7/2009 |
| JP | 2012215909 A | 11/2012 |
| JP | 2015-45751 A | 3/2015 |
| WO | 2014/208164 A1 | 12/2014 |
| WO | 2016/103869 A1 | 6/2016 |
| WO | 2016/129279 A1 | 8/2016 |

OTHER PUBLICATIONS

Written Opinion for PCT/JP2017/033410 dated Dec. 5, 2017 [PCT/ISA/237].

\* cited by examiner

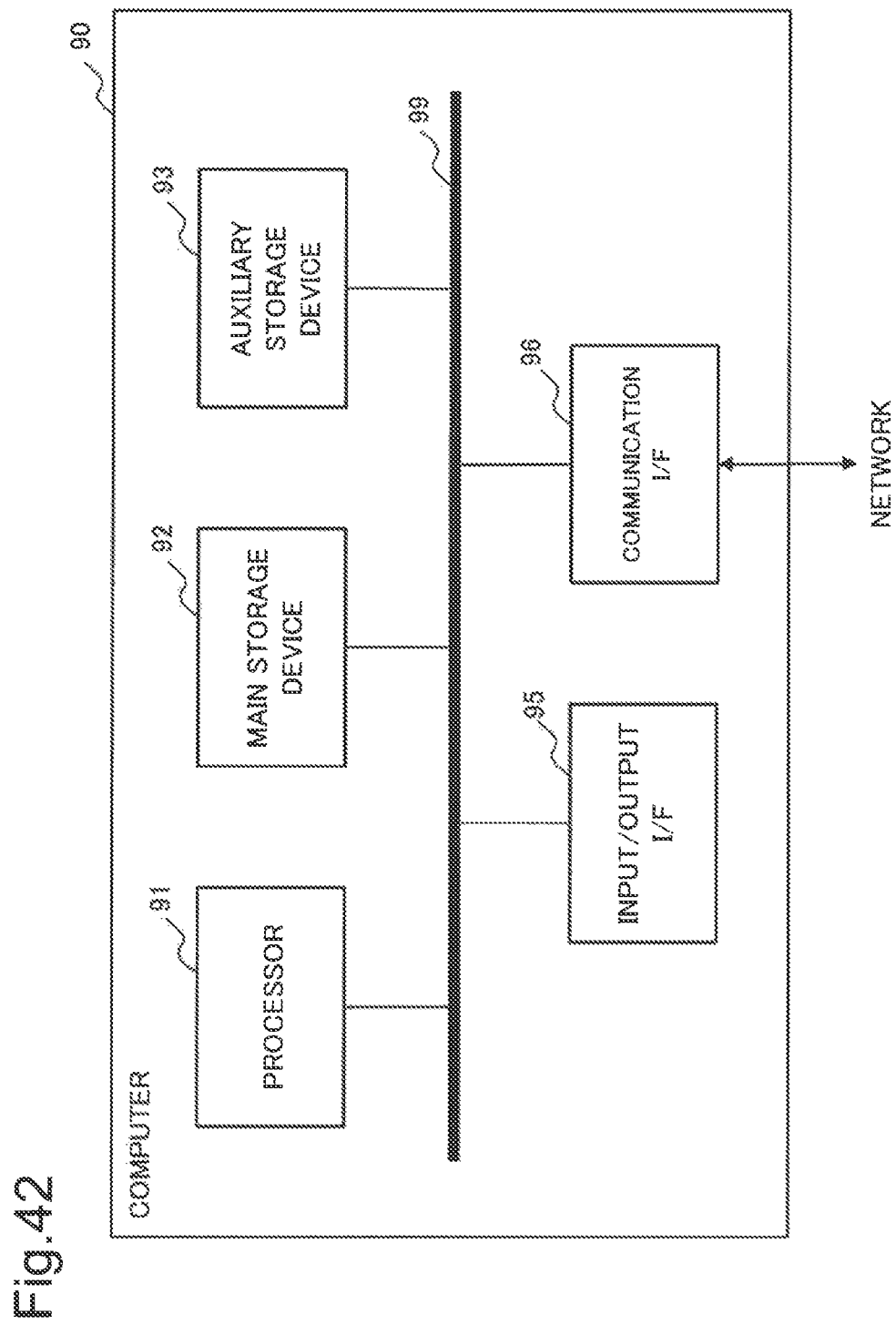

PROJECTION SYSTEM

CROSS REFERENCE TO RELATED APPLICATIONS

This application is a National Stage of International Application No. PCT/JP2017/033410, filed on Sep. 15, 2017, which claims priority from Japanese Patent Application No. 2016-184071, filed on Sep. 21, 2016, the contents of all of which are incorporated herein by reference in their entirety.

TECHNICAL FIELD

The present invention relates to a projection system that projects display information on a plurality of display areas.

BACKGROUND ART

In a public facility such as a hotel or a hall, when display information can be projected on a ceiling or a wall, it becomes easy to guide a facility's user to an appropriate destination. For example, in a hotel, when display information can be projected on a wall, a user who has checked in can be guided to a room, or a user can be safely evacuated at the time of disaster, without relying on manpower.

When display information is projected inside a public facility, it is assumed that a projector is placed in a narrow pathway such as a corridor. In such a situation, it is desired to place a projector capable of projection at an extremely close distance despite a small size in such a way as not to hinder user and staff passage. It is difficult for a general projector to project large display information on a corridor wall or ceiling at an extremely close distance. This is because, in order to display, at an extremely close distance, display information large enough to be visually perceived even from a distance, it is necessary to use a complicated optical system or perform distortion correction by much calculation.

PTL 1 discloses a projection device that can project a high-resolution image despite simple arrangement. The device in PTL 1 irradiates a reflective spatial phase modulator element with an illumination light beam from an illumination optical system having a structure including no λ plate, and projects light reflected by the spatial phase modulator element on a screen. Furthermore, the device in PTL 1 uses a shielding member, and thus inhibits zeroth-order light contained in the light reflected by the spatial phase modulator element from being displayed on the screen.

PTL 2 discloses a video display device that achieves wide-angle viewing without requiring any large-diameter additional optical system and can minimize distortion and aberration even upon a change in distance to a screen. The device in PTL 2 includes a front lens group including a plurality of refractive lenses having rotationally symmetrical surfaces, a rear lens group including a plurality of lenses each having at least one rotationally asymmetrical surface, and a reflecting mirror that has a freeform surface and reflects light emerging from the rear lens group.

CITATION LIST

Patent Literature

[PTL 1] Japanese Unexamined Patent Application Publication No. 2008-145613 A
[PTL 2] Japanese Unexamined Patent Application Publication No. 2012-215909 A

SUMMARY OF INVENTION

Technical Problem

With the device in PTL 1, the illumination optical system can have a simple structure. However, there is a problem that the device in PTL 1 can project an image on a single screen but cannot project a desired image on each of a plurality of screens located at different positions. Further, in the device in PTL 1, at a close distance from the screen, an image loss in a zeroth-order light-shielded portion does not blur but is conspicuous. In the device in PTL 1, there is a problem that, when projected light is reduced in amount in order to make the zeroth-order light inconspicuous, it is difficult to display sufficiently bright display information on the screen.

With the device in PTL 2, since lens decentering is unnecessary, wide-angle viewing is achieved without an increase in overall device size, and an image can be projected with less distortion and aberration even at a close distance from the screen. However, in the device in PTL 2, since a complicated lens group is formed by combining a plurality of lenses, projecting sufficiently bright projected light requires setting a light source output to be high, and setting the light source output to be high, in turn, requires a high-capacity battery or power supply. Further, there is a problem that the device in PTL 2 can project an image on a single screen but cannot project a desired image on a plurality of screens.

An object of the present invention is to provide a projection system that can project sufficiently bright display information on a plurality of display areas without distortion.

Solution to Problem

A projection system according to the present invention includes: a projector including a light source, a phase-modulation-type spatial light modulator element that includes a display part displaying a pattern corresponding to display information, and modulates and emits light radiated on the display part from the light source, and an optical system that projects modulated light emitted from the spatial light modulator element; a controller that generates a control condition for controlling the light source and the spatial light modulator element, based on a display condition acquired from a host system, and controls the light source and the spatial light modulator element, based on the generated control condition; and a reflecting mirror that reflects projected light from the projector toward a plurality of display areas.

Advantageous Effects of Invention

The present invention can provide a projection system that can project sufficiently bright display information on a plurality of display areas without distortion.

BRIEF DESCRIPTION OF DRAWINGS

FIG. 42 is a conceptual view illustrating an exemplary hardware configuration associated with the projection systems according to the example embodiments of the present invention.

EXAMPLE EMBODIMENT

Figure 1:
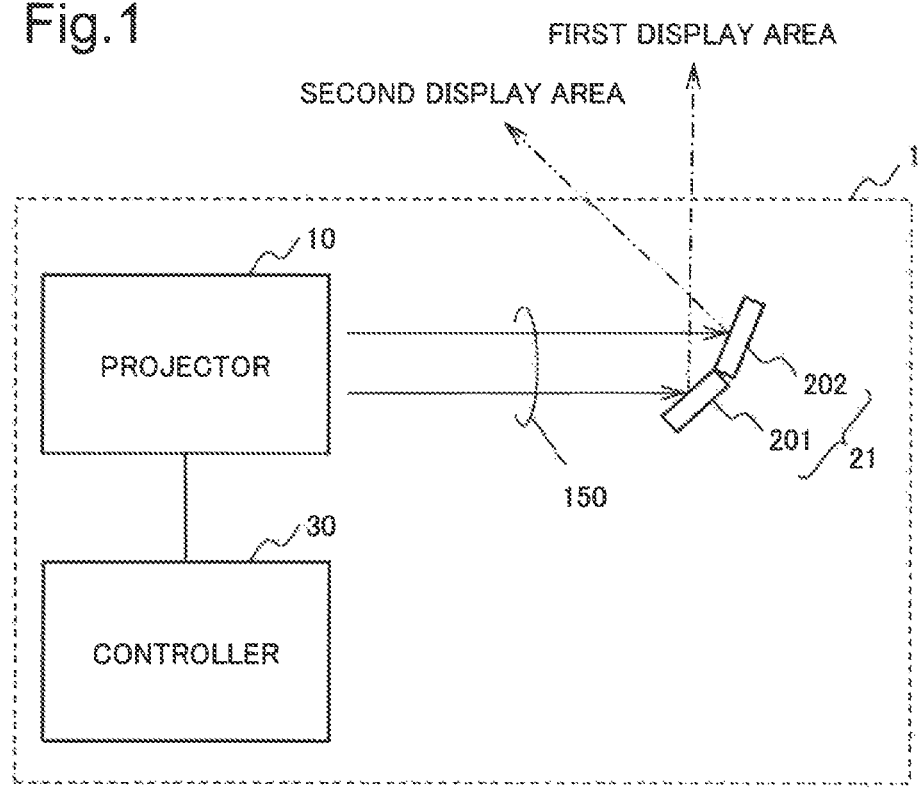
FIG. 1 is a conceptual view illustrating one configuration of a projection system according to a first example embodiment of the present invention.

Example embodiments of the present invention will be described below with reference to the drawings. In the following example embodiments, technically preferable limitations are imposed to carry out the present invention, but the scope of this invention is not limited to the following description. In all drawings used to describe the following example embodiments, the same reference numerals denote similar parts unless otherwise specified. In addition, in the following example embodiments, a repetitive description of similar configurations or arrangements and operations may be omitted.

First Example Embodiment (Configuration)

The configuration of a projection system 1 according to a first example embodiment of the present invention will be described first with reference to the drawings.

FIG. 1 is a conceptual view illustrating one configuration of the projection system 1 according to this example embodiment. The projection system 1 according to this example embodiment includes a projector 10, a reflecting mirror 21, and a controller 30, as illustrated in FIG. 1.

The projector 10 includes a spatial light modulator element and emits radiated light 150 under the control of the controller 30. The reflecting mirror 21 includes a plurality of mirrors and reflects the radiated light 150 emitted from the projector 10 toward a plurality of display areas. The display area means a screen on which the projected light reflected by the reflecting mirror 21 is displayed as display information. The controller 30 controls the projector 10 to emit the radiated light 150.

In the example illustrated in FIG. 1, the reflecting mirror 21 is formed by a first mirror 201 and a second mirror 202. Light reflected by the first mirror 201 travels toward a first display area, and light reflected by the second mirror travels toward a second display area.

Figure 2:
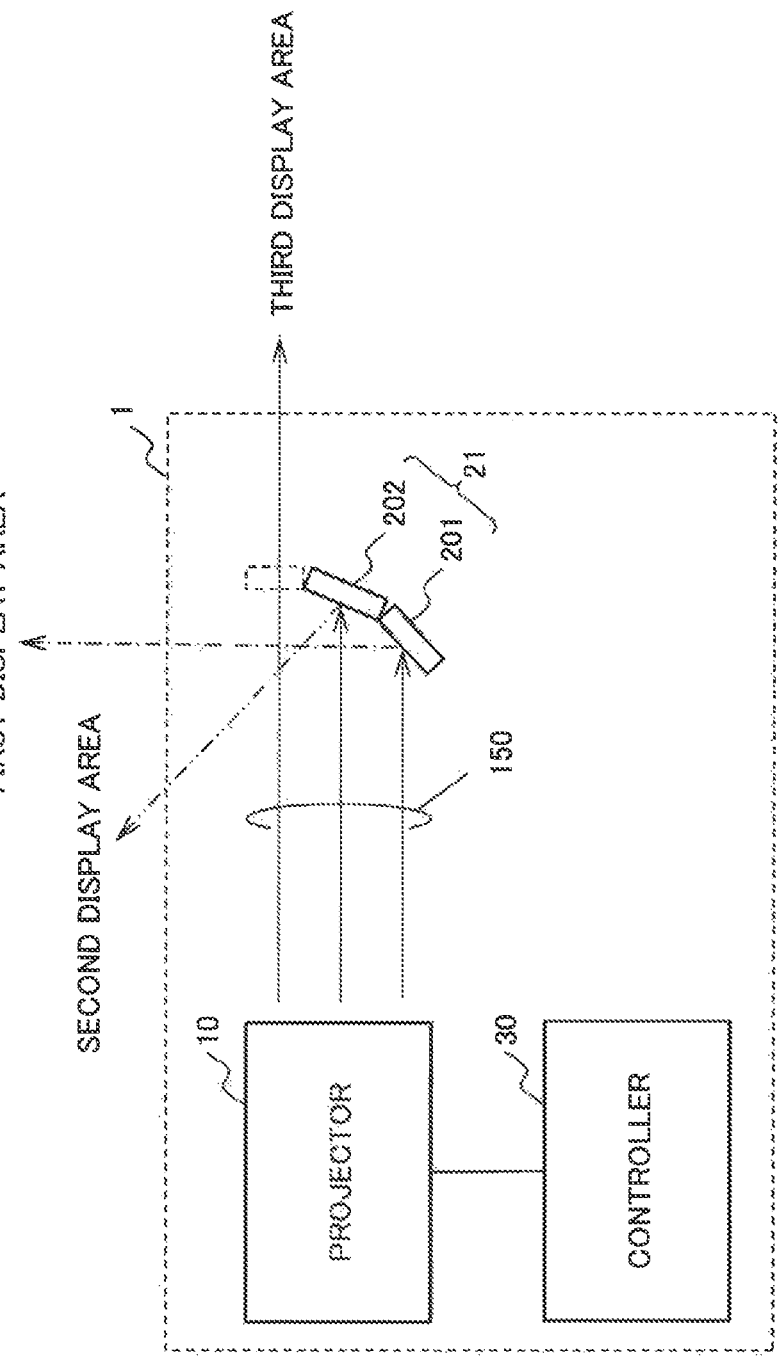
FIG. 2 is a conceptual view illustrating another exemplary configuration of the projection system according to the first example embodiment of the present invention.

FIG. 2 is a conceptual view illustrating another exemplary configuration of the projection system 1. The example illustrated in FIG. 2 is identical to that illustrated in FIG. 1 in terms of forming a reflecting mirror 21 by a first mirror 201 and a second mirror 202. The example illustrated in FIG. 2 is different from that illustrated in FIG. 1 in terms of applying a certain component of radiated light 150 to an area (the range indicated by a broken line) located outside the reflecting mirror 21 and guiding the light to a third display area.

Each component constituting the projection system 1 in this example embodiment will be described in detail below.

<Projector>

Figure 3:
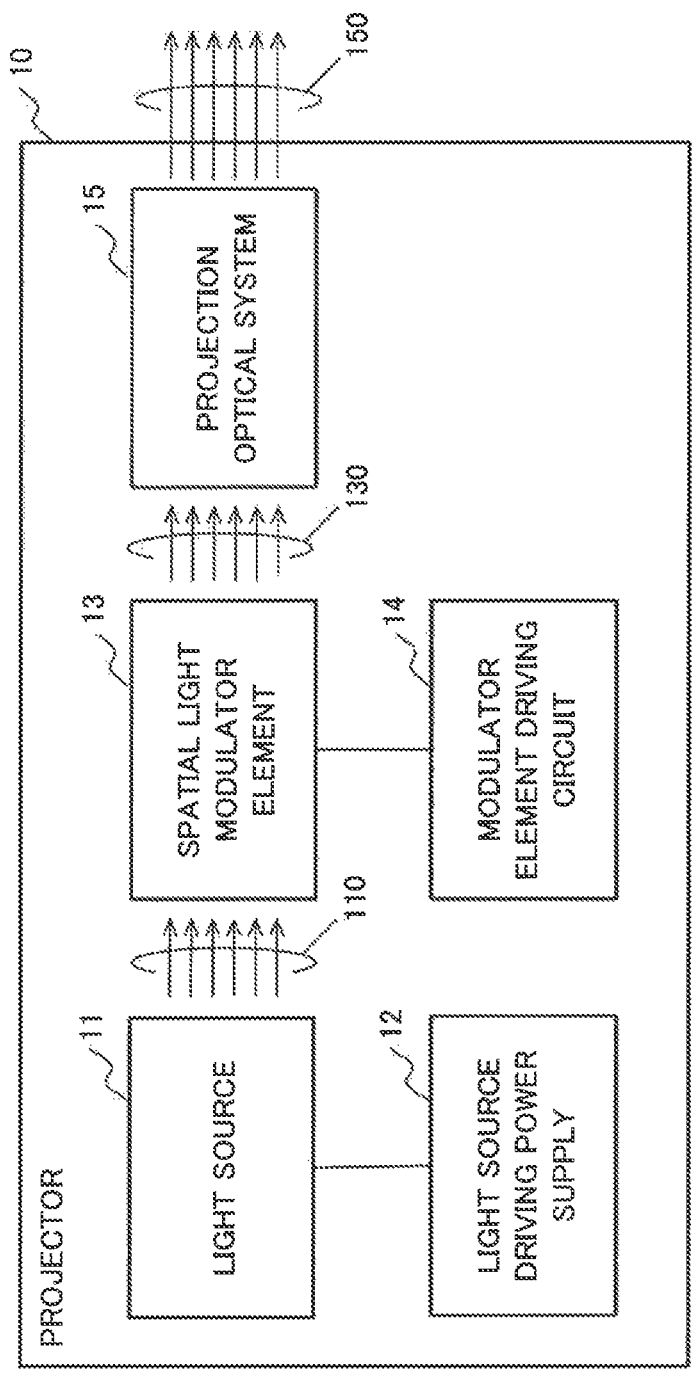
FIG. 3 is a block diagram illustrating the configuration of a projector of the projection system according to the first example embodiment of the present invention.
Figure 4:
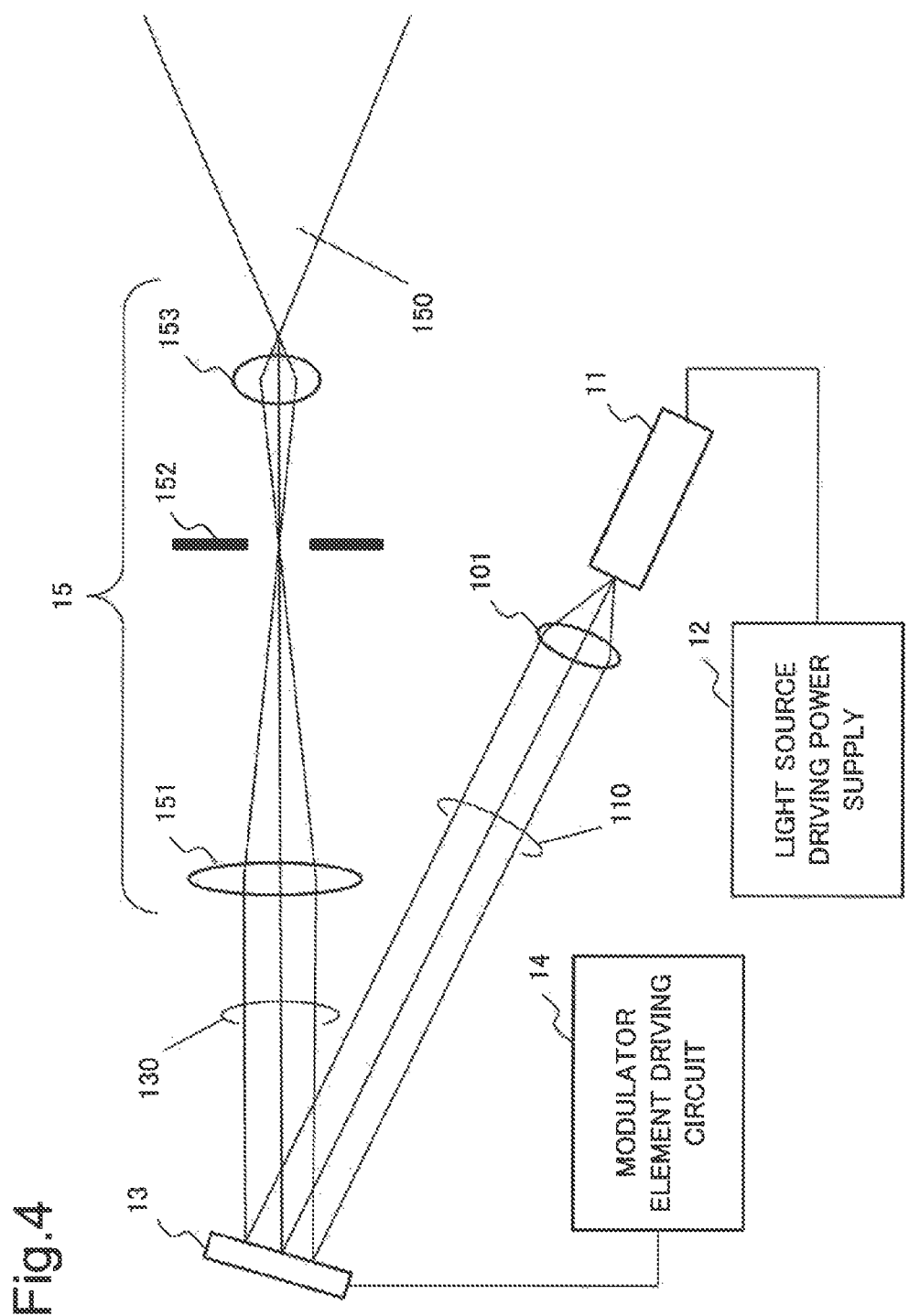
FIG. 4 is a conceptual view illustrating the configuration of an optical system of the projection system according to the first example embodiment of the present invention.

The projector 10 will be described in detail first. FIG. 3 is a block diagram illustrating the configuration of the projector 10 of the projection system 1. FIG. 4 is a conceptual view illustrating an exemplary configuration of an optical system included in the projection system 1.

The projector 10 includes a light source 11, a light source driving power supply 12, a spatial light modulator element 13, a modulator element driving circuit 14, and a projection optical system 15, as illustrated in FIG. 3. FIG. 3 is conceptual, and does not accurately represent the positional relationships between the respective components, the radiation direction of light, and the like.

The light source 11 emits light 110 having a specific wavelength. A laser light source, for example, can be used as the light source 11. The light 110 emitted from the light source 11 is preferably in-phase coherent light. Generally, the light source 11 is configured to emit light in the visible range. The light source 11 may also be configured to emit light in a range other than the visible range, such as the infrared or ultraviolet range. The light source 11 may even be implemented as a light source other than a laser light source, such as a light-emitting diode, an incandescent lamp, or a discharge tube.

The light 110 emitted from the light source 11 is converted into coherent light 110 by a collimator 101 and enters a display part of the spatial light modulator element 13, as illustrated in FIG. 4. When, for example, the light source 11 is configured to emit light having a plurality of wavelengths, the color of display information can be changed by changing the wavelength of the light emitted from the light source 11. When the light source 11 is configured to simultaneously emit light beams having different wavelengths, display information having a plurality of colors can be displayed.

The light source driving power supply 12 is used to cause the light source 11 to emit light by driving the light source 11 under the control of the controller 30.

The spatial light modulator element 13 displays a pattern for generating display information to be displayed on each display area, on its display part under the control of the modulator element driving circuit 14. In this example embodiment, the light 110 is applied to the display part of the spatial light modulator element 13 with a predetermined pattern displayed on this display part. The spatial light modulator element 13 modulates the incident light 110 and emits modulated light 130 toward the projection optical system 15.

In this example embodiment, the incident angle of the light 110 is set non-perpendicular to the display part of the spatial light modulator element 13, as illustrated in FIG. 4. In other words, in this example embodiment, the exit axis of the light 110 from the light source 11 is set oblique with respect to the display part of the spatial light modulator element 13. Since setting the exit axis of the light 110 oblique with respect to the display part of the spatial light modulator element 13 allows the light 110 to enter the display part of the spatial light modulator element 13 even without a beam splitter, the efficiency can be improved.

The spatial light modulator element 13 can be implemented as a phase-modulation-type spatial light modulator element that, upon incidence of in-phase coherent light 110, modulates the phase of the incident light 110. The phase-modulation-type spatial light modulator element 13 has a focus-free arrangement and therefore requires no change in focal point for each distance even when light is projected on display areas set at a plurality of projection distances. When the spatial light modulator element 13 can display, display information on each display area, it may be of a type different from the phase modulation type, but the following description assumes the spatial light modulator element 13 as a phase-modulation-type element.

The display part of the phase-modulation-type spatial light modulator element 13 displays the phase distribution of display information displayed on each display area. In this case, the modulated light 130 reflected by the display area of the spatial light modulator element 13 forms an image representing a set of diffraction gratings of some kind or the like, and display information is formed to concentrate light diffracted by the diffraction gratings.

The spatial light modulator element 13 is implemented as a spatial light modulator element using, for example, ferroelectric liquid crystal, homogeneous liquid crystal, or vertical alignment liquid crystal. More specifically, the spatial light modulator element 13 can be implemented using liquid crystal on silicon (LCOS). The spatial light modulator element 13 may also be implemented using, for example, micro electro mechanical system (MEMS).

The use of the phase-modulation-type spatial light modulator element 13 allows concentration of energy on the portion of display information by its operation to sequentially switch the display area on which the projected light is to be projected. Therefore, the phase-modulation-type spatial light modulator element can display, display information more brightly than spatial light modulator elements of other types, for the same light source output.

The modulator element driving circuit 14 displays a pattern for generating display information to be displayed on each display area, on the display part of the spatial light modulator element 13 under the control of the controller 30. In driving the phase-modulation-type modulator element, the modulator element driving circuit 14 drives the spatial light modulator element 13 to change a parameter for determining the difference between the phase of the light 110 applied to the display part of the spatial light modulator element 13 and that of the modulated light 130 reflected by this display part.

The parameter for determining the difference between the phase of the light 110 applied to the display part of the phase-modulation-type spatial light modulator element 13 and the phase of the modulated light 130 reflected by this display part is associated with an optical characteristic such as the refractive index or the optical path length. For example, the modulator element driving circuit 14 changes the refractive index of the display part of the spatial light modulator element 13 by changing the voltage applied to this display part. As a result, the light 110 applied to the display part is diffracted as appropriate, based on the refractive index of the display part. In other words, the phase distribution of the light 110 applied to the phase-modulation-type spatial light modulator element 13 is modulated according to the optical characteristic of the display part. The method for driving the spatial light modulator element 13 by the modulator element driving circuit 14 is not limited to the example given herein.

The projection optical system 15 projects the light 130 modulated by the spatial light modulator element 13 as the radiated light 150. The projection optical system 15 includes a Fourier transform lens 151, an aperture 152, and a projection lens 153, as illustrated in FIG. 4. The light 130 modulated by the spatial light modulator element 13 is applied toward the reflecting mirror 21 as the radiated light 150 by the projection optical system 15. As long as display information can be displayed on each display area, any component constituting the projection optical system 15 may be omitted.

The Fourier transform lens 151 serves as an optical lens for forming at a neighboring focal point, an image generated when the modulated light 130 reflected by the display part of the spatial light modulator element 13 is projected at infinity. Referring to FIG. 4, a focal point is formed at the position of the aperture 152.

The aperture 152 has the function of shielding high-order light contained in the light focused by the Fourier transform lens 151 and specifying a display area. The opening portion of the aperture 152 is smaller than the outermost periphery of the display area at the position of the aperture 152 and located to shield the area around the display information at the position of the aperture 152. The opening portion of the aperture 152 is formed in, for example, a rectangular or circular shape. The aperture 152 is preferably located at the focal position of the Fourier transform lens 151, but it may be shifted from this focal position as long as it can exhibit the function of eliminating high-order light.

The projection lens 153 serves as an optical lens that enlarges and projects the light focused by the Fourier transform lens 151. The projection lens 153 projects the radiated light 150 toward the reflecting mirror 21 to display on each display area, display information corresponding to the phase distribution input to the spatial light modulator element 13.

When the projection system 1 is used to project a line drawing such as a simple symbol, the radiated light 150 projected from the projection optical system 15 is projected not uniformly on each display area but in a concentrated manner on a portion such as a character or a letter, a symbol, or a frame constituting the display information. In such a case, the projection system 1 can practically reduce the amount of emission of the light 110 and, in turn, can keep the overall light output low. In other words, since the projection system 1 can use a small, low-power light source 11, the light source driving power supply 12 that drives the light source 11 may have a low output, and the overall power consumption can thus be reduced.

<Reflecting Mirror>

Figure 5:
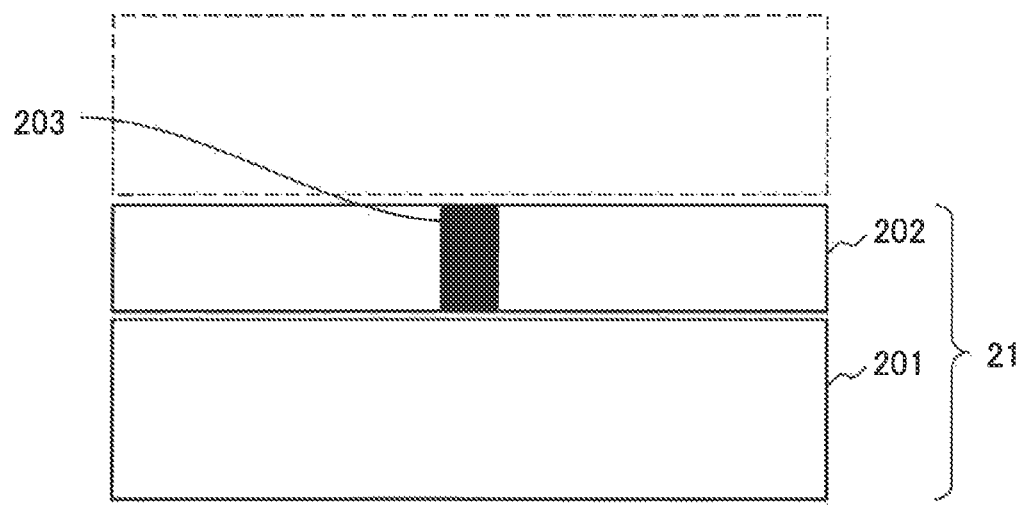
FIG. 5 is a plan view illustrating an exemplary arrangement of a reflecting mirror of the projection system according to the first example embodiment of the present invention.

The reflecting mirror 21 will be described in detail below. FIG. 5 is a plan view illustrating an exemplary arrangement of the reflecting mirror 21 of the projection system 1. FIG. 5 assumes that the reflecting mirror 21 is used in the example illustrated in FIG. 2, and does not limit the arrangement of the reflecting mirror 21 according to this example embodiment.

The reflecting mirror 21 includes a first mirror 201 and a second mirror 202. The reflecting mirror 21 projects the radiated light 150 emitted from the projector 10 on a desired display area. The reflecting mirror 21 is configured not to cause distortion when the radiated light 150 emitted from the projector 10 is displayed on a desired display area.

In this example embodiment, the zeroth-order light shielding unit 203 is mounted on the second mirror 202. The zeroth-order light shielding unit 203 may also be mounted on the first mirror 201. In addition, no limitations are imposed on the size and the shape of the zeroth-order light shielding unit 203.

The reflecting surfaces of the first mirror 201 and the second mirror 202 constituting the reflecting mirror 21 need not be flat, and may be curved surfaces that correct distortion, such as freeform or aspherical surfaces. The use of, for example, freeform or aspherical surfaces as the reflecting surfaces of the mirrors allows projection of display information free from distortion on each display area. The freeform surface means not a rotationally symmetrical curved surface, but a curved surface generated by independently defining polynomials representing horizontal and vertical curves as the reflecting surface of the mirror is viewed from the front. Since the use of freeform surfaces as the reflecting surfaces of the mirrors allows adjustment by associating the curved surface shape with each position in the display area, aberration correction can be improved.

The first mirror 201 has a reflecting surface that reflects the radiated light 150. The first mirror 201 reflects a certain component of the radiated light 150 toward the first display area. The reflecting surface of the first mirror 201 is adjusted to display appropriate display information on the first display area at an appropriate size.

The second mirror 202 has a reflecting surface that reflects the radiated light 150. The second mirror 202 reflects a certain component of the radiated light 150 toward the second display area. The reflecting surface of the second mirror 202 is adjusted to display appropriate display information on the second display area at an appropriate size. The second mirror 202 also includes a zeroth-order light shielding unit 203 on its reflecting surface. When zeroth-order light may be displayed, the zeroth-order light shielding unit 203 may be omitted.

The zeroth-order light shielding unit 203 is a part that shields zeroth-order light contained in the radiated light 150 emitted from the projector 10 so as not to display it on each display area. The zeroth-order light shielding unit 203 may be configured to absorb zeroth-order light, or may be configured to guide zeroth-order light in a direction deviating from each display area. The zeroth-order light shielding unit 203 may even be implemented as an opening that passes zeroth-order light contained in the radiated light 150.

When the zeroth-order light shielding unit 203 is configured to absorb zeroth-order light, a light absorbing material can be used. As the light absorbing material, a black body material, for example, is suitable, and carbon, oxide, or plastic, for example, is available. When the wavelength of laser light used is fixed, the zeroth-order light shielding unit 203 may be made of a light absorbing material that selectively absorbs light having this wavelength. Unless zeroth-order light contained in the radiated light 150 is projected, any material is available as a light absorbing material used for the zeroth-order light shielding unit 203.

In other words, in the example illustrated in FIG. 5, display of zeroth-order light on the display areas is prevented by inhibiting the zeroth-order light from being reflected by the reflecting mirror 21. In the example illustrated in FIG. 5, since light can be selectively projected on a desired display area, no unnecessary light is projected outside the display area, and the resolution of display information can thus be improved.

Figure 6:
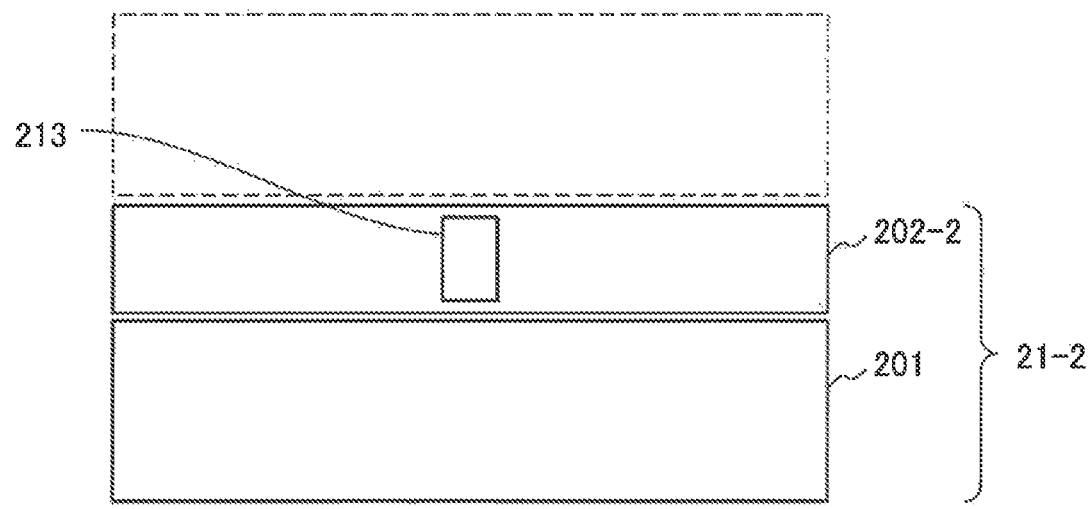
FIG. 6 is a plan view illustrating another exemplary arrangement of the reflecting mirror of the projection system according to the first example embodiment of the present invention.

A reflecting mirror 21-2 that includes a second mirror 202-2 including an opening 213 formed in a portion passing zeroth-order light and is configured to pass the zeroth-order light through the opening 213 and inhibit the zeroth-order light from being reflected by each display area, for example, may be used, as illustrated in FIG. 6. The opening 213 may be formed in a part of the second mirror 202-2, as illustrated in FIG. 6, or may be formed in a part of the first mirror 201. As long as the first mirror 201 and the second mirror 202-2 are connected to each other, the second mirror 202-2 may be divided in the portion of the opening 213. The opening 213 is one mode of the zeroth-order light shielding unit 203.

An application example in which the projection system 1 having the configuration illustrated in FIG. 2 is mounted in a pathway such as a corridor will be given herein with reference to FIGS. 7 to 9. In the example illustrated in FIGS. 7 to 9, the projection system 1 is mounted on the wall of a pathway, and light is projected in a plurality of directions from the projection system 1. The projection system 1 is mounted by, for example, hanging it from a ceiling or making it protrude from a wall.

Figure 7:
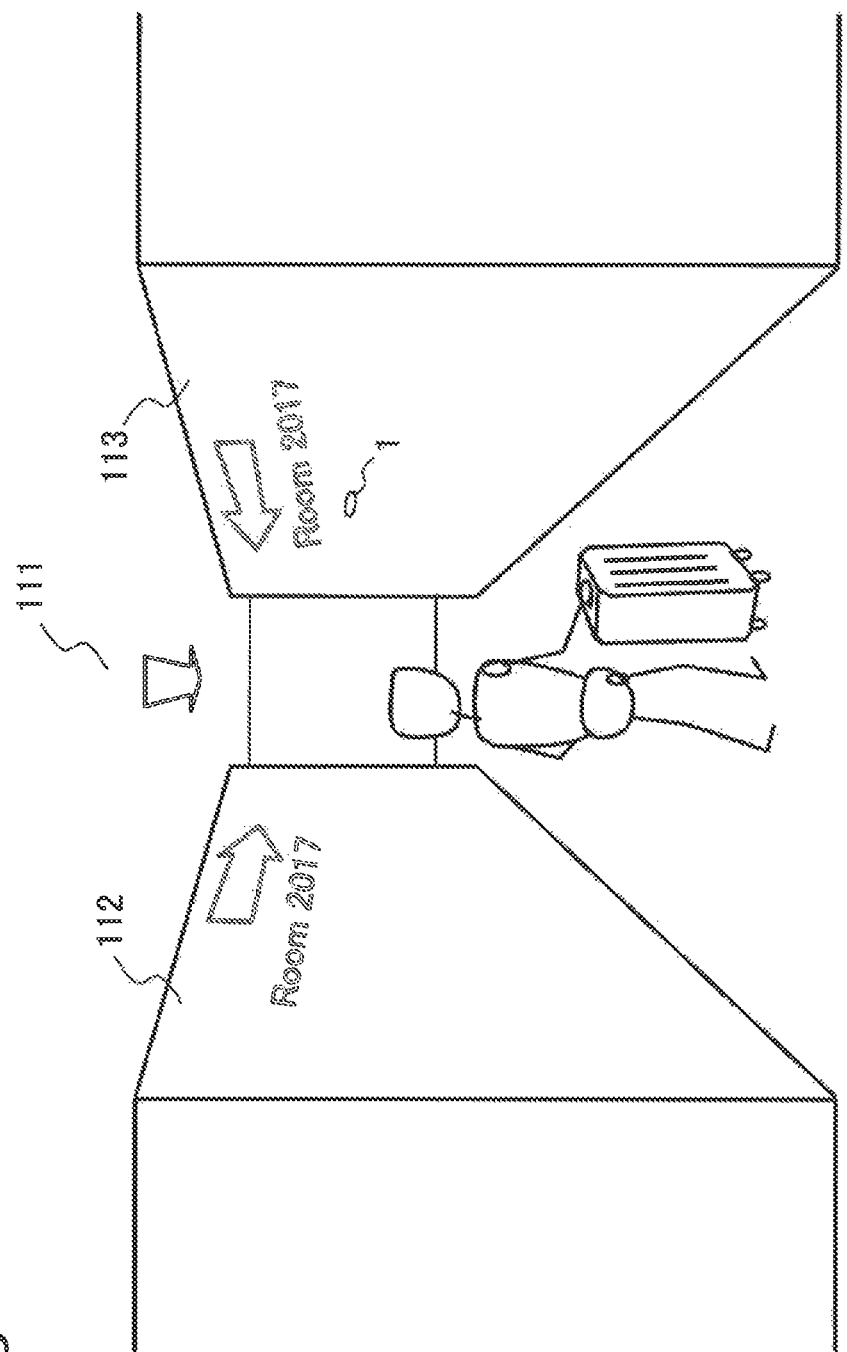
FIG. 7 is a conceptual view illustrating an exemplary usage scene of the projection system according to the first example embodiment of the present invention.

FIG. 7 illustrates a usage scene in which a user is guided to an appropriate destination using display information projected from the projection system 1 mounted on the wall of the pathway. The display information is given image information including a symbol such as a character or a numeral or a figure such as a circle or an arrow. However, referring to FIG. 7, with respect to the direction in which the user travels, the wall located on the left side is defined as a left wall 112, and the wall located on the right side is defined as a right wall 113. In the example illustrated in FIG. 7, desired display information is displayed on each display area by projecting light from the projection system 1 mounted on the right wall 113 toward a ceiling 111, the left wall 112, and the right wall 113. Note that FIG. 7 depicts conceptual display information displayed on the left wall 112, the right wall 113, and the ceiling 111, and does not accurately depict, for example, the orientations, the sizes, the display positions, and the details of the display information.

Figure 8:
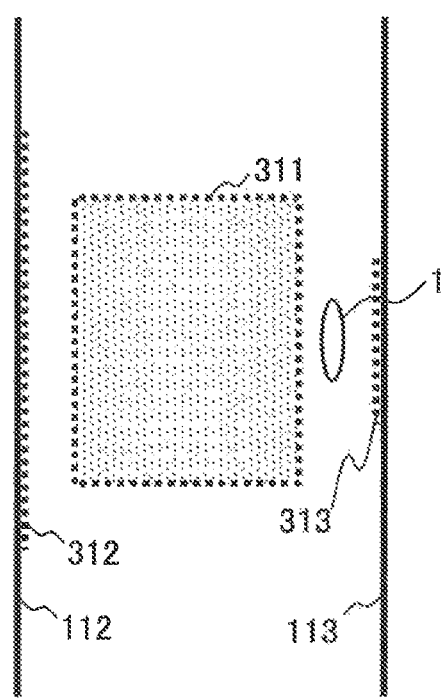
FIG. 8 is a conceptual view illustrating an exemplary mounting position and projection areas of the projection system according to the first example embodiment of the present invention.

FIG. 8 is a conceptual view illustrating the pathway in FIG. 7 when viewed from above. The projection system 1 projects light toward a display area 311 (first display area) on the ceiling 111, a display area 312 (second display area) on the left wall 112, and a display area 313 (third display area) on the right wall 113.

Figure 9:
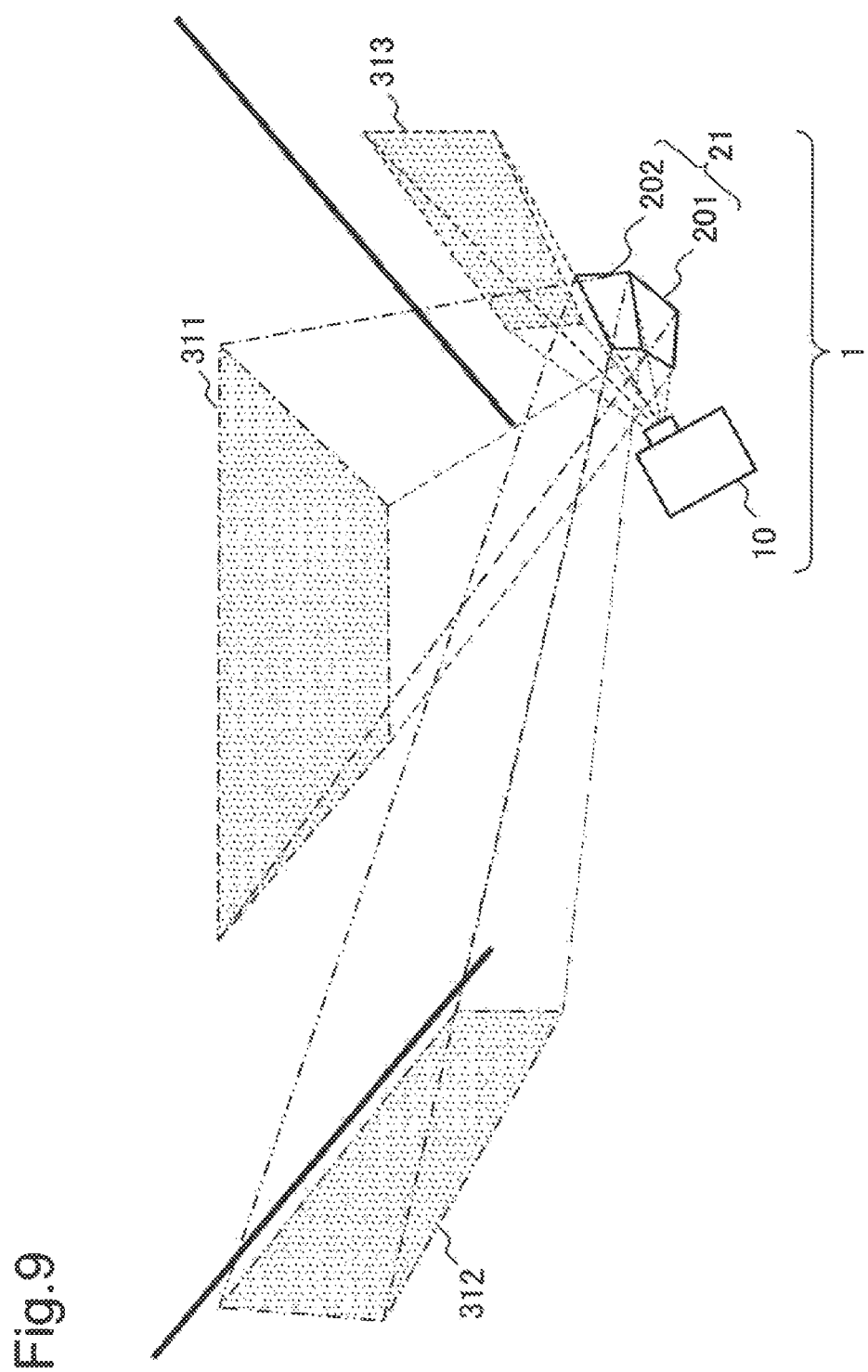
FIG. 9 is a conceptual view illustrating an exemplary layout and projection of the projection system according to the first example embodiment of the present invention.

FIG. 9 is a conceptual view illustrating the projection system 1 mounted as illustrated in FIG. 7, when viewed obliquely upwards. In the example illustrated in FIG. 9, light reflected by the first mirror 201 is projected toward the display area 311, and light reflected by the second mirror 202 is projected toward the display area 312. Light projected with a shift from the reflecting mirror 21 is projected toward the display area 313.

In other words, light reflected by the first mirror 201 is projected toward the display area 311, and first display information is displayed on the display area 311. Light reflected by the second mirror 202 is projected toward the display area 312, and second display information is displayed on the display area 312. Radiated light applied with a shift from the reflecting mirror 21 is projected toward the display area 313, and third display information is displayed on the display area 313. The pieces of first to third display information may be different types of display information, or may all be the same display information.

Figure 10:
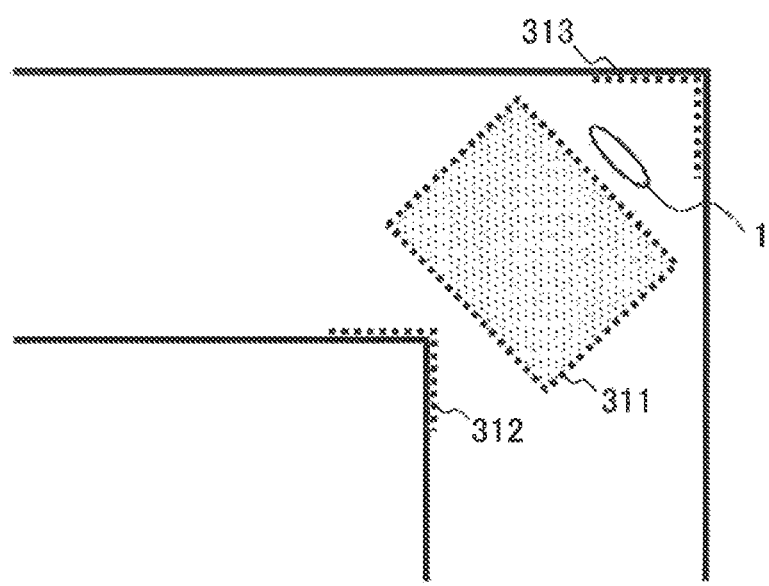
FIG. 10 is a conceptual view illustrating an exemplary mounting position and projection areas of the projection system according to the first example embodiment of the present invention.

The projection system 1 can also be mounted at the corner of a pathway, as illustrated in FIG. 10. In the example illustrated in FIG. 10, light reflected by the first mirror 201 is projected toward the display area 311 on a ceiling, and light reflected by the second mirror 202 is projected toward the display area 312. Light applied with a shift from the reflecting mirror 21 is projected toward the display area 313.

In this example embodiment, appropriate display information is formed in desired display areas by reflecting an image projected from the projector 10 toward the desired display areas by a plurality of mirrors. In the example illustrated in FIGS. 7 to 9, projection on the wall located in the front with respect to the projection direction is directly performed without the mirrors. Projection on the ceiling is performed using the lower portion of the projected image. Projection on the wall upper portion located in the back with respect to the projection direction is performed by changing the direction using the mirrors. As a result, according to this example embodiment, display information can be displayed in every direction. In this example embodiment, distortion correction is performed in each mirror to display normal display information on each display area.

Figure 11:
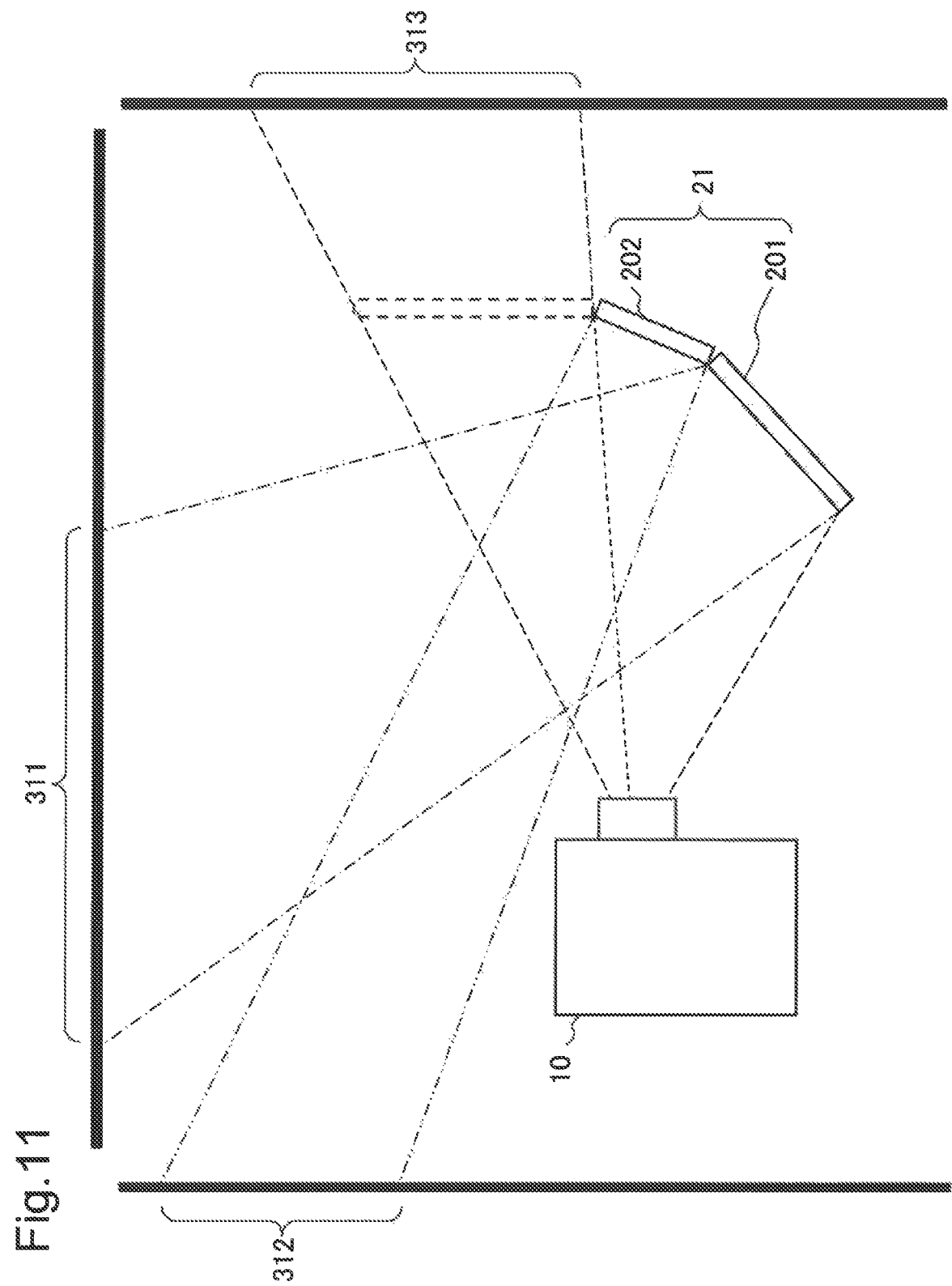
FIG. 11 is a conceptual view illustrating an example in which light projected from the projector of the projection system according to the first example embodiment of the present invention is reflected by the reflecting mirror.

FIG. 11 illustrates an example in which the radiated light 150 from the projector 10 is reflected by the reflecting mirror 21. Referring to FIG. 11, the radiated light 150 is applied from the projector 10 toward the reflecting mirror 21. The radiated light 150 emitted from the projector 10 is reflected in different directions by the first mirror 201 and the second mirror 202 and even applied to a position (the range indicated by a broken line) where the first mirror 201 and the second mirror 202 are not placed.

The first mirror 201 and the second mirror 202 reflect in different directions, the radiated light 150 emitted from the projector 10. The first mirror 201 reflects a certain component of the radiated light 150 toward a first display area, and the reflected light is projected toward the display area 311. As a result, first display information is displayed on the display area 311. The second mirror 202 reflects a certain component of the radiated light 150 toward a second display area different from the first display area, and the reflected light is projected toward the display area 312. As a result, second display information is displayed on the display area 312.

Radiated light applied with a shift from the position of the first mirror 201 and the second mirror 202 is projected on the display area 313 without passing through the reflecting mirror 21. As a result, third display information is displayed on the display area 313.

The above-mentioned pieces of first to third display information are individual pieces of display information corresponding to the display areas 311 to 313, respectively.

Figure 12:
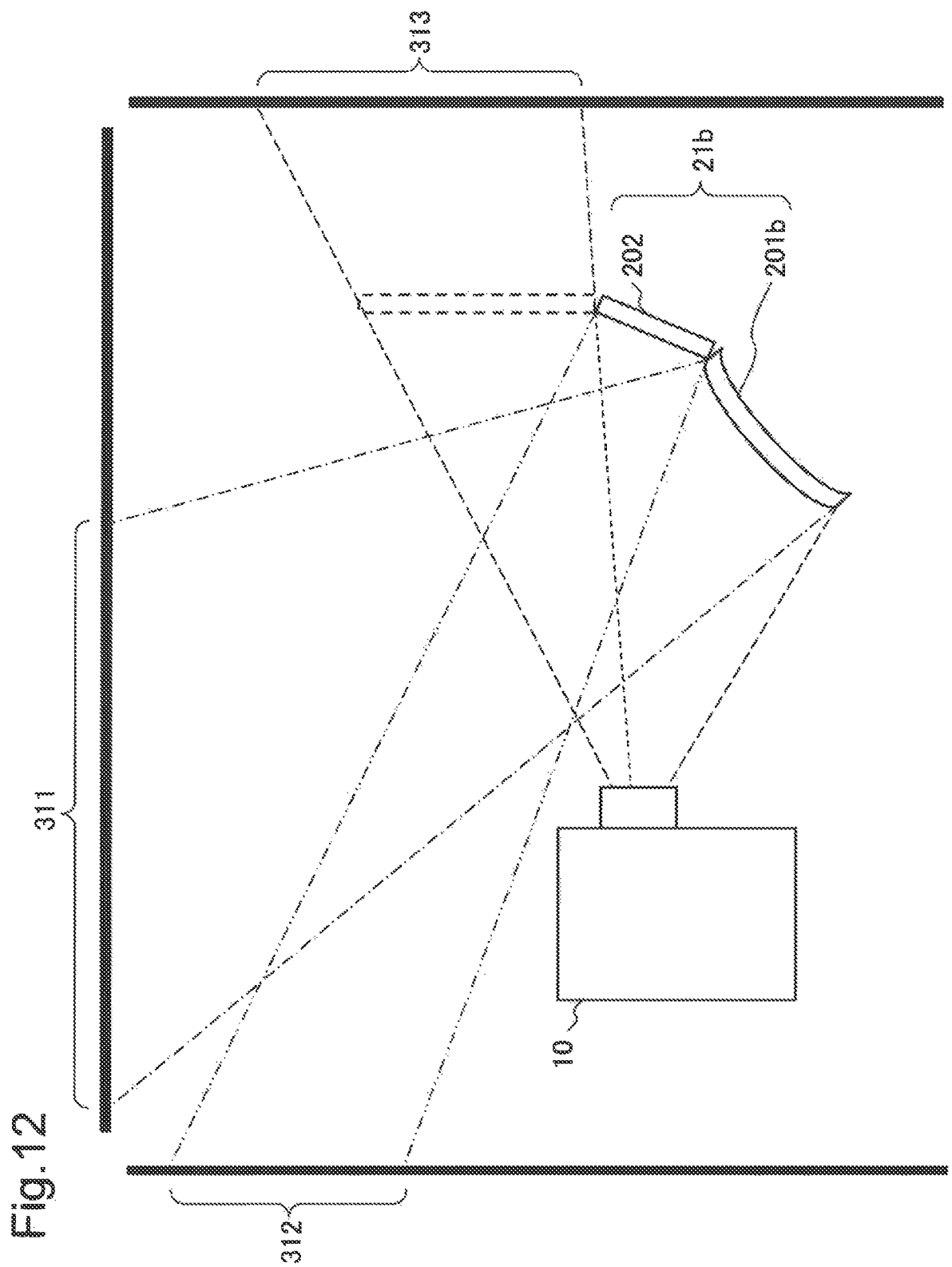
FIG. 12 is a conceptual view illustrating another example in which light projected from the projector of the projection system according to the first example embodiment of the present invention is reflected by the reflecting mirror.

FIG. 12 illustrates a reflecting mirror 21b including a first mirror 201b implemented as a convex mirror. When the first mirror 201b of the reflecting mirror 21b is implemented as a convex mirror, the display area 311 can be enlarged more than when a plane mirror is used.

Figure 13:
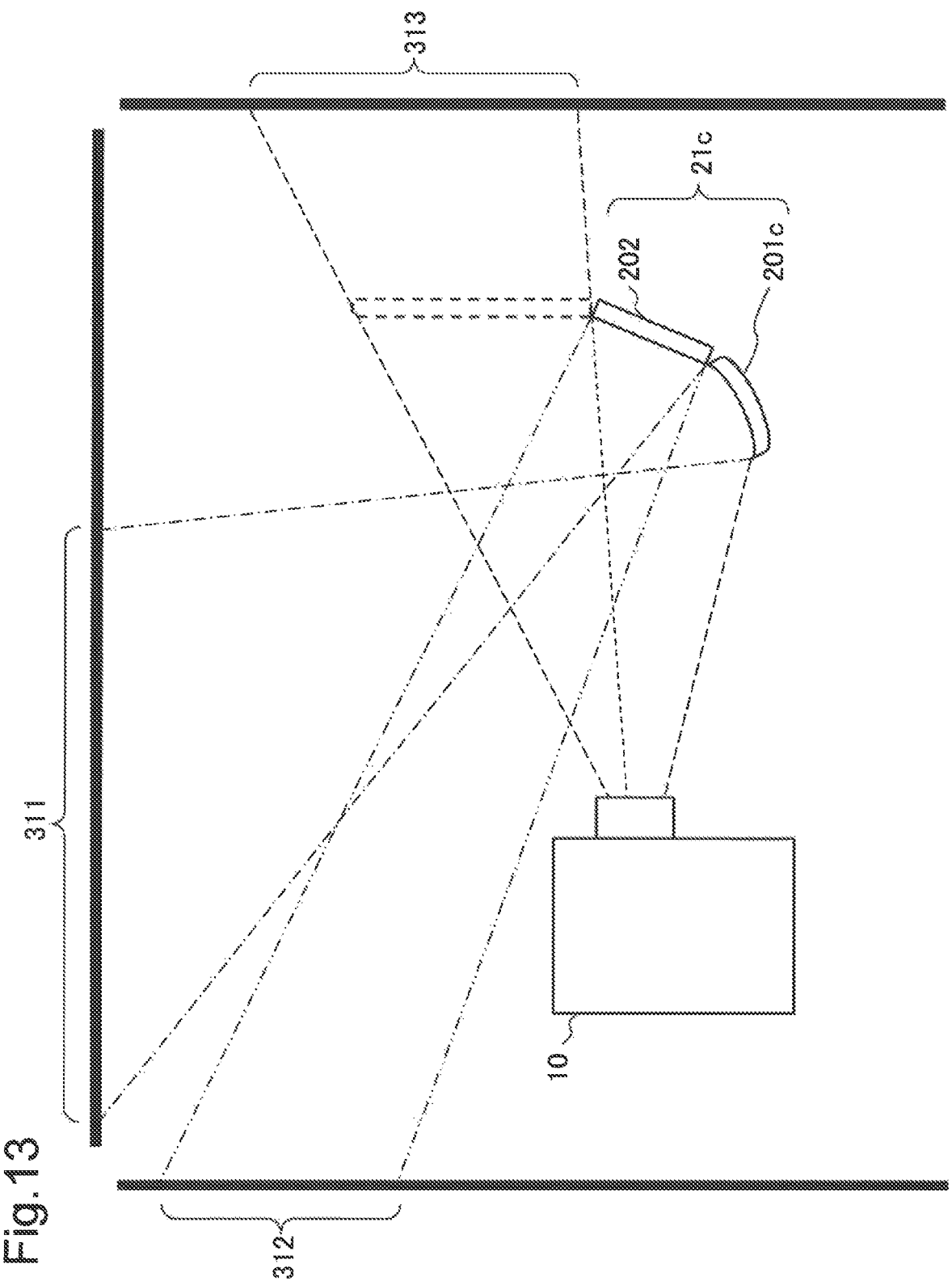
FIG. 13 is a conceptual view illustrating still another example in which light projected from the projector of the projection system according to the first example embodiment of the present invention is reflected by the reflecting mirror.

FIG. 13 illustrates a reflecting mirror 21c including a first mirror 201c implemented as a concave mirror. When the first mirror 201c of the reflecting mirror 21c is implemented as a concave mirror, the display area 311 can be enlarged more than when a convex mirror is used. Again, when the first mirror 201c is implemented as a concave mirror, display information equal in size to that when a convex mirror is used can be displayed at an extremely close distance. When, however, a concave mirror is used, since display information is inverted, a pattern displayed on the display part of the spatial light modulator element 13 needs to be inverted.

Referring to FIGS. 12 and 13, the second mirror 202 may be implemented as a convex or concave mirror. Referring to FIGS. 11 to 13, each of the first mirror 201 (201b or 201c) and the second mirror 202 may be implemented as a convex or concave mirror, and these mirrors may be combined together.

Figure 14:
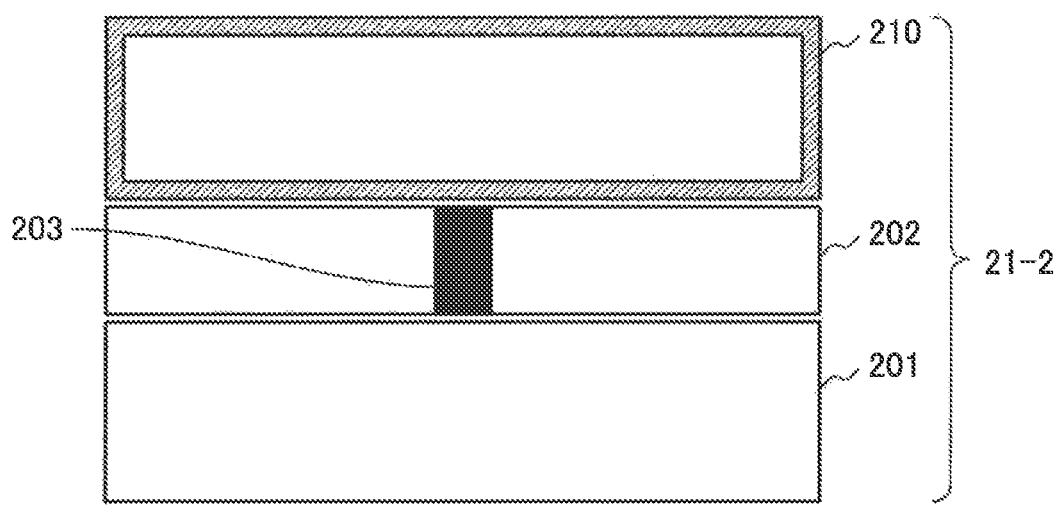
FIG. 14 is a conceptual view illustrating a Modification of the projection system according to the first example embodiment of the present invention.
Figure 15:
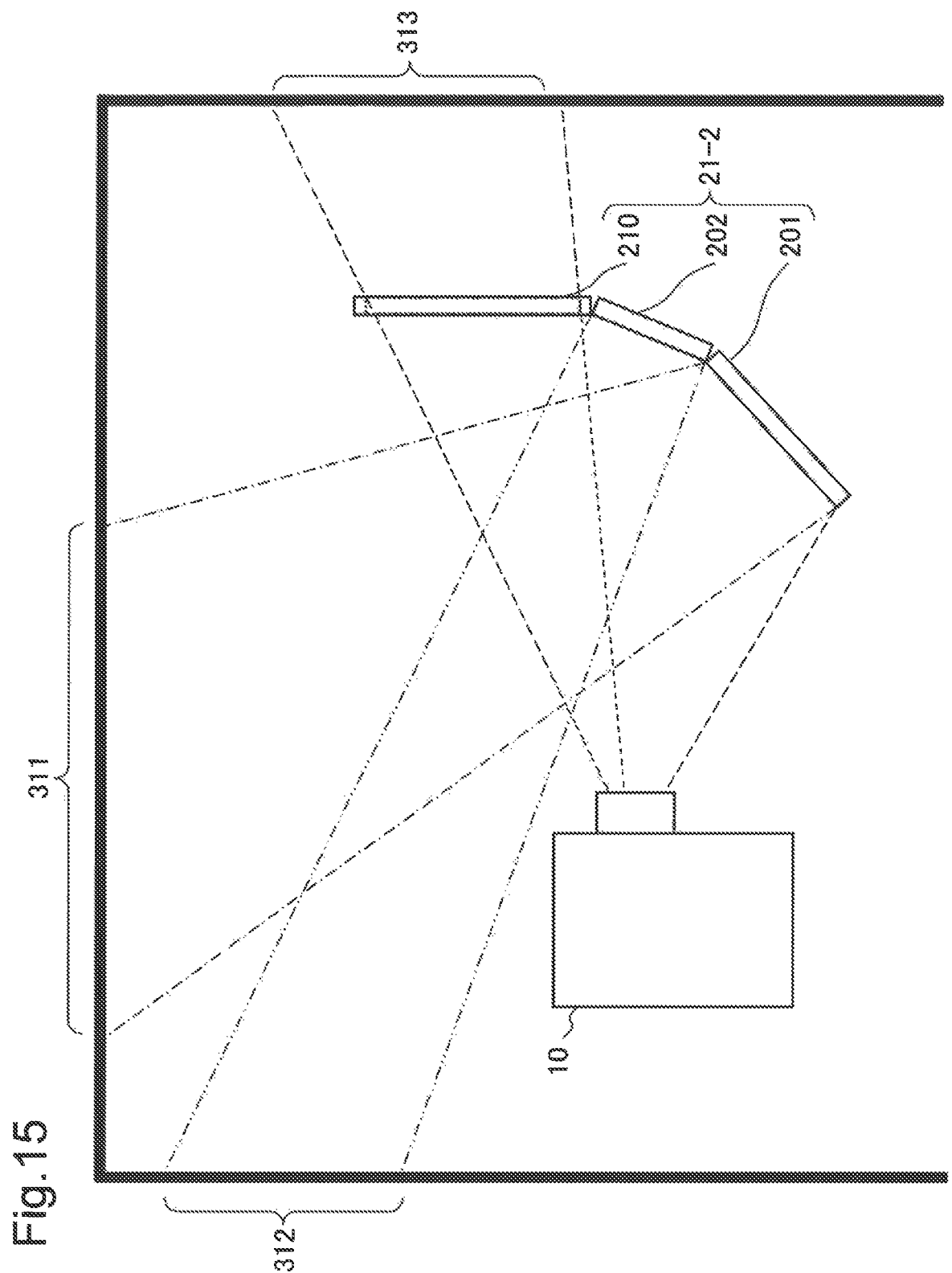
FIG. 15 is a conceptual view illustrating an example in which light projected from a projector in the Modification of the projection system according to the first example embodiment of the present invention is reflected by a reflecting mirror.

FIGS. 14 and 15 are conceptual views illustrating the arrangements of reflecting mirrors 21-2 as other examples of the reflecting mirror 21. The reflecting mirror 21-2 illustrated in FIG. 14 includes a frame 210 that passes a certain component of the radiated light 150.

As illustrated in FIG. 15, using the reflecting mirror 21-2, a component, passing through the opening portion of the frame 210, of the radiated light 150 applied with a shift from the reflecting mirror 21-2 is projected on the display area 313. In other words, with the reflecting mirror 21-2 illustrated in FIG. 14, since light around the display area 313 can be shielded by the frame 210, it is easy to define the periphery of the display area 313.

<Controller>

Figure 16:
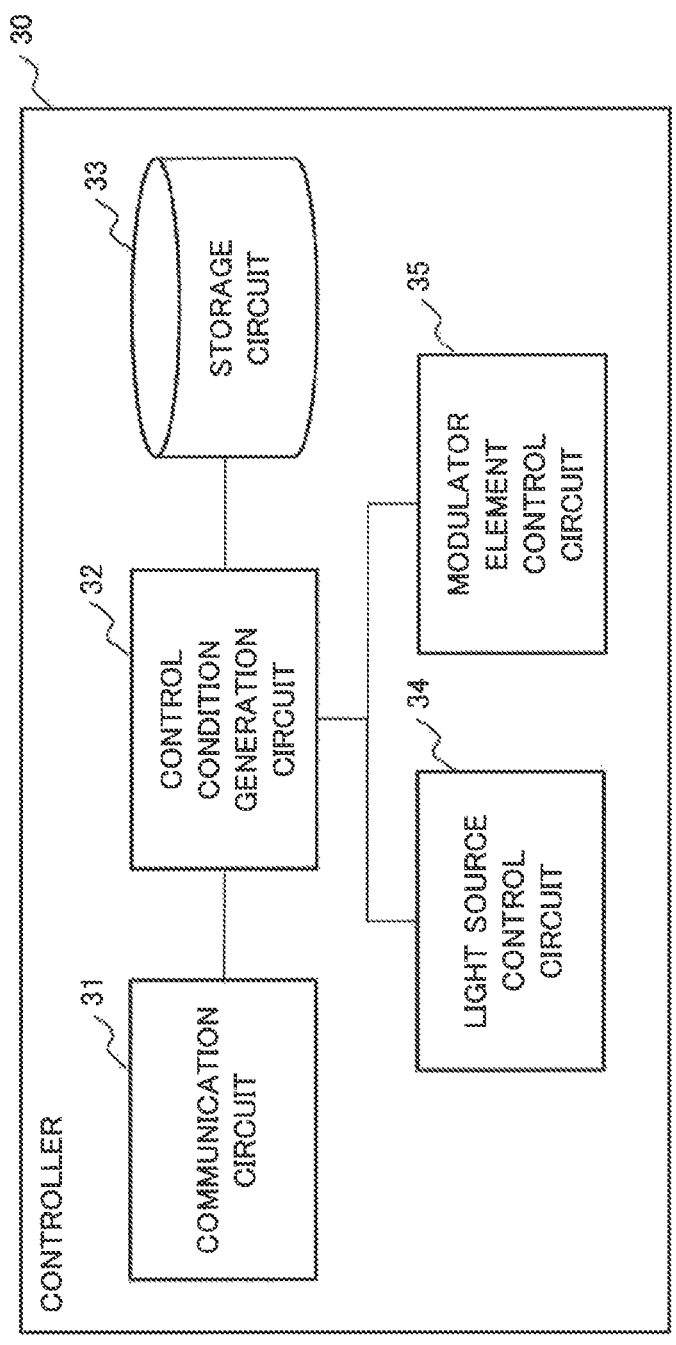
FIG. 16 is a block diagram illustrating the configuration of a controller of the projection system according to the first example embodiment of the present invention.

The controller 30 will be described in detail below. FIG. 16 is a block diagram illustrating the configuration of the controller 30 of the projection system 1. The controller 30 includes a communication circuit 31, a control condition generation circuit 32, a storage circuit 33, a light source control circuit 34, and a modulator element control circuit 35, as illustrated in FIG. 16. The communication circuit 31 receives conditions (to be referred to as display conditions hereinafter) for displaying appropriate display information on each display area at an appropriate timing from a host system (not illustrated) of the projection system 1.

The host system analyzes data captured by a camera placed in the moving path of a user targeted to visually perceive display information. The host system, upon recognizing the user from the analyzed data, transmits display conditions for displaying display information to be visually perceived by the user on an appropriate display area at an appropriate timing to the projection system 1.

The display conditions received by the communication circuit 31 are set to display appropriate display information on a wall or a ceiling close to a user at an appropriate timing, based on, for example, identification information representing the identity of the user, positional information of the user, and the time instants when these pieces of information are acquired. The identification information allows identification of the user, such as the name or the identification (ID) of the user. The positional information represents the position of the user in a two- or three-dimensional coordinate system. The traveling direction and speed of the user are those of the user during movement. The display conditions may also be set based on information such as the traveling direction and speed and the destination of the user.

The communication circuit 31 outputs the received display conditions to the control condition generation circuit 32.

The control condition generation circuit 32 acquires a basic pattern constituting a pattern to be displayed on each display area from the storage circuit 33, based on the display conditions acquired from the communication circuit 31. The control condition generation circuit 32 generates a pattern to be displayed on the display part of the spatial light modulator element 13 by moving or synthesizing the basic pattern stored in the storage circuit 33. When the spatial light modulator element 13 is implemented as a phase-modulation-type element, a pattern for displaying desired display information on each display area is a phase distribution corresponding to the display information.

The control condition generation circuit 32 generates control conditions for projecting the acquired pattern toward an appropriate display area at an appropriate timing and outputs the generated control conditions to the light source control circuit 34 and the modulator element control circuit 35. The control conditions include light source control conditions and modulator element control conditions (to be described later).

The control condition generation circuit 32 generates light source control conditions including the timing and the amount of output of light from the light source 11. The light source control conditions are used to control the timing when the light source 11 emits light, and correspond to conditions for controlling the timing when desired display information is projected. The control condition generation circuit 32 outputs the generated light source control conditions to the light source control circuit 34.

The control condition generation circuit 32 also generates modulator element control conditions including the type of pattern to be displayed on the display part of the spatial light modulator element 13 and the timing when this pattern is displayed. The modulator element control conditions are used to display a pattern corresponding to desired display information on the display part of the spatial light modulator element 13 at an appropriate timing. The timing when a pattern corresponding to desired display information is displayed on the display part of the spatial light modulator element 13 is synchronized with the driving timing of the light source 11 included in the light source control conditions. The control condition generation circuit 32 outputs the generated modulator element control conditions to the modulator element control circuit 35.

The storage circuit 33 stores a basic pattern constituting a pattern for displaying desired display information on each display area. For example, the storage circuit 33 may acquire and store, in advance, a basic pattern generated by the host system. When a small number of pieces of information need to be displayed on each display area, since a finite number of display patterns are to be stored in the storage circuit 33, the storage circuit 33 may have a low capacity.

The light source control circuit 34 performs control for driving the light source driving power supply 12, based on the acquired light source control conditions. For example, the light source control circuit 34 may transmit a control signal representing the output value of the light source 11 to the light source driving power supply 12 at a timing that depends on the light source control conditions.

The modulator element control circuit 35 drives the modulator element driving circuit 14, based on the acquired modulator element control conditions. For example, the modulator element control circuit 35 may transmit data containing the pattern to be displayed on the spatial light modulator element 13 to the modulator element driving circuit 14 at a timing that depends on the modulator element control conditions. A pattern corresponding to display information to be displayed on each display area may be transmitted to the projector 10 in advance, and a control signal may be transmitted from the modulator element control circuit 35 at the timing when the pattern is displayed on the display part of the spatial light modulator element 13.

As described above, according to this example embodiment, sufficiently bright display information can be projected on a plurality of display areas without distortion by distortion correction using a plurality of mirrors constituting the reflecting mirror.

The use of a phase-modulation-type spatial light modulator element allows projection of bright display information despite its small size, although the display information is limited to, for example, line drawings and characters or letters. When, however, a phase-modulation-type spatial light modulator element is simply used, since projection without distortion correction results in considerable distortion and an unnecessary image projected even outside a desired projection area, it is difficult to project highly precise display information on a desired display area. In this example embodiment, highly precise display information can be projected on a desired display area by distortion correction using mirrors constituting the reflecting mirror.

In the projection system according to this example embodiment, projected light can be concentrated on the portion of display information, using the phase-modulation-type spatial light modulator element. Therefore, display information as bright as that when a high-power external power supply is used can be displayed using a low-power portable power supply. In other words, according to this example embodiment, since only a necessary image is projected in a desired projection area, highly precise display information can be projected on a desired display area. Furthermore, since the projection system according to this example embodiment can be mounted without hindering passage because of its smaller size compared to a normal projector, display information can be displayed on a plurality of display areas even by a single device.

The use of the projection system according to this example embodiment can construct a system capable of reliably guiding a user who has checked in at a hotel to his or her room. Assume, for example, that a plurality of cameras are mounted in spaces inside the hotel, such as a front desk, a lobby, or a corridor. Then, the projection system according to this example embodiment is mounted at a crossroad or a portion where the user is more likely to go the wrong way.

First, face authentication data of a user who has checked in at a hotel are acquired at the front desk. In, for example, the lobby or the corridor of the hotel, the user is recognized by a camera other than that placed at the front desk. When the user approaches, the projection system displays appropriate display information on, for example, a wall, a ceiling, or a floor easy for the user to visually perceive. When the user is guided to his or her room, display information such as a room number and an arrow may be displayed, as illustrated in FIG. 7. The user can know appropriate information by visually perceiving the display information displayed on, for example, a wall, a ceiling, or a floor.

When, for example, a plurality of cameras are collectively managed by a server, a projector that displays display information can be appropriately selected by making the plurality of cameras cooperate with each other and repeating acquisition and estimation of user's positional information. With this arrangement, display information to be visually perceived by a certain user can be prevented from being displayed on a completely irrelevant display area.

The projection system according to this example embodiment, for example, may be mounted in conjunction with an emergency light indicating the direction and the position of an emergency exit, or may be mounted in place of such an emergency light. The projection system according to this example embodiment may also be mounted in conjunction with a luminaire such as a ceiling-mounted luminaire.

Second Example Embodiment

A projection system 2 according to a second example embodiment of the present invention will be described next. The first example embodiment and this example embodiment are identical to each other in terms of the configurations of a projector and a controller, but they are different from each other in terms of the structure of a reflecting mirror.

Figure 17:
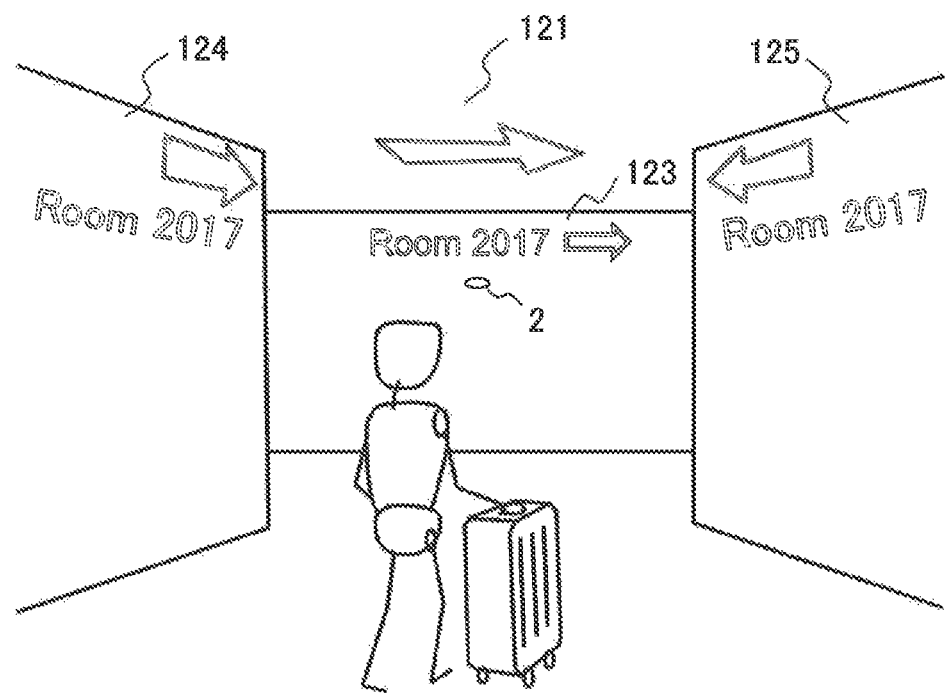
FIG. 17 is a conceptual view illustrating an exemplary usage scene of a projection system according to a second example embodiment of the present invention.
Figure 18:
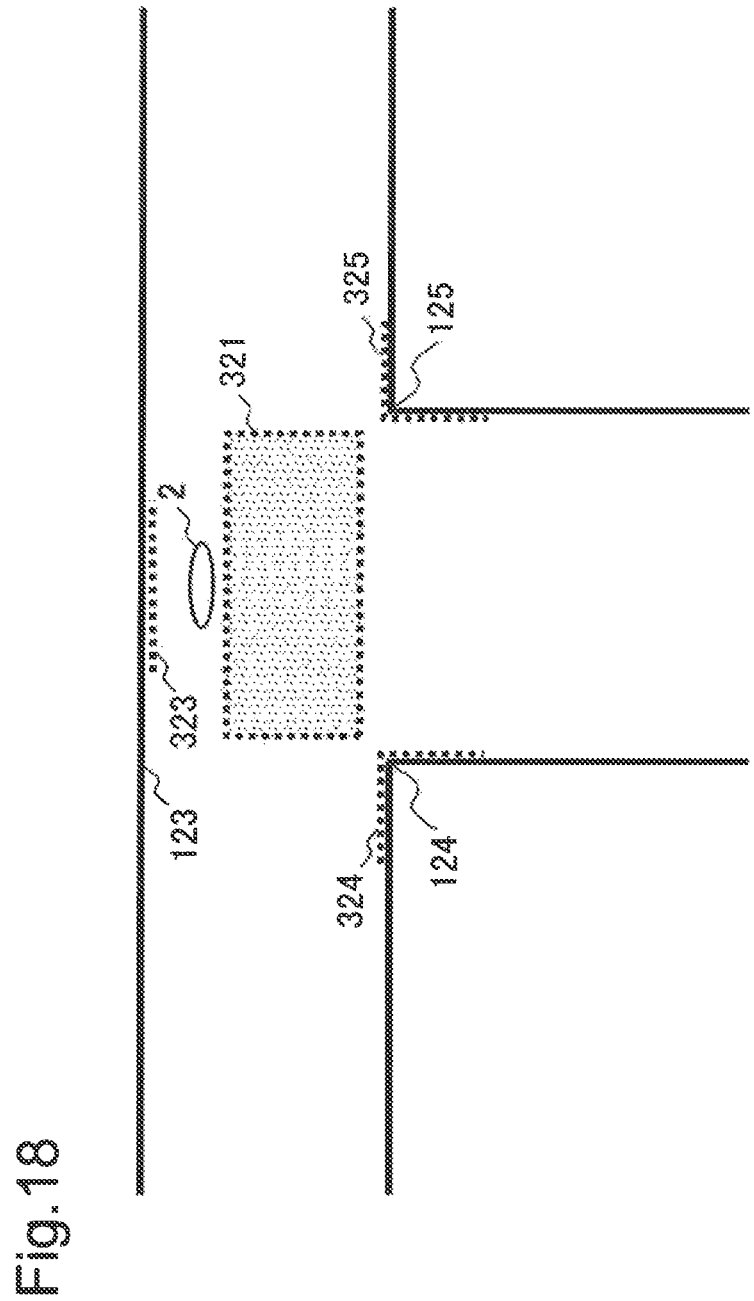
FIG. 18 is a conceptual view illustrating an exemplary mounting position and projection areas of the projection system according to the second example embodiment of the present invention.

FIGS. 17 and 18 illustrate an example in which the projection system 2 is mounted at a T-junction, and light is projected on a plurality of display areas. FIG. 17 illustrates a usage scene in which a user is guided to an appropriate place using display information projected from the projection system 2 mounted at a T-junction. FIG. 18 is a view illustrating the T-junction in FIG. 17 when viewed from above. In the example illustrated in FIGS. 17 and 18, the projection system 2 is mounted on a wall 123 located at the end of the T-junction.

The projection system 2 displays display information on a display area 321 on a ceiling 121, a display area 324 at an upper wall corner 124 of the left wall, a display area 325 at an upper wall corner 125 of the right wall, and a display area 323 on the wall 123 at the end. In this example embodiment, display information is displayed near the upper corners of walls opposed to the wall 123 at the end, and near the upper corners of the left and right walls by projecting projected light toward the wall corners 124 and 125. Note that FIG. 17 depicts conceptual display information displayed on the ceiling 121, the wall corners 124 and 125, and the wall 123, and does not accurately depict, for example, the orientations, the sizes, the display positions, and the details of the display information.

Figure 19:
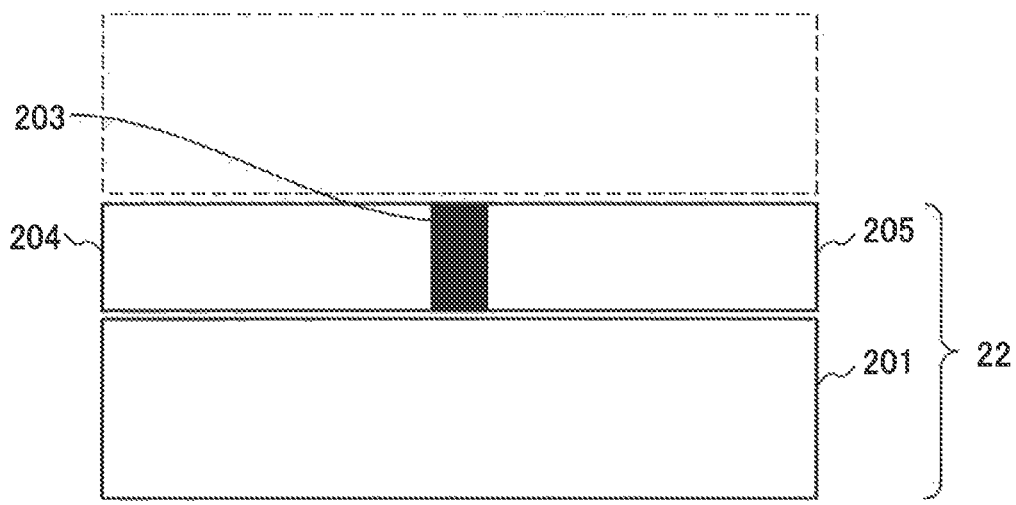
FIG. 19 is a conceptual view illustrating an exemplary arrangement of a reflecting mirror of the projection system according to the second example embodiment of the present invention.

FIG. 19 illustrates an exemplary arrangement of a reflecting mirror 22 of the projection system 2. The reflecting mirror 22 is different from that in the projection system 1 in terms of forming the second mirror 202 of the projection system 1 by two mirrors (mirrors 204 and 205). In this example embodiment, the mirrors 204 and 205 are combined together to further divide the reflection direction of the second mirror into two different directions. FIG. 19 illustrates merely an example, and does not limit the arrangement of the reflecting mirror 22 according to this example embodiment.

Figure 20:
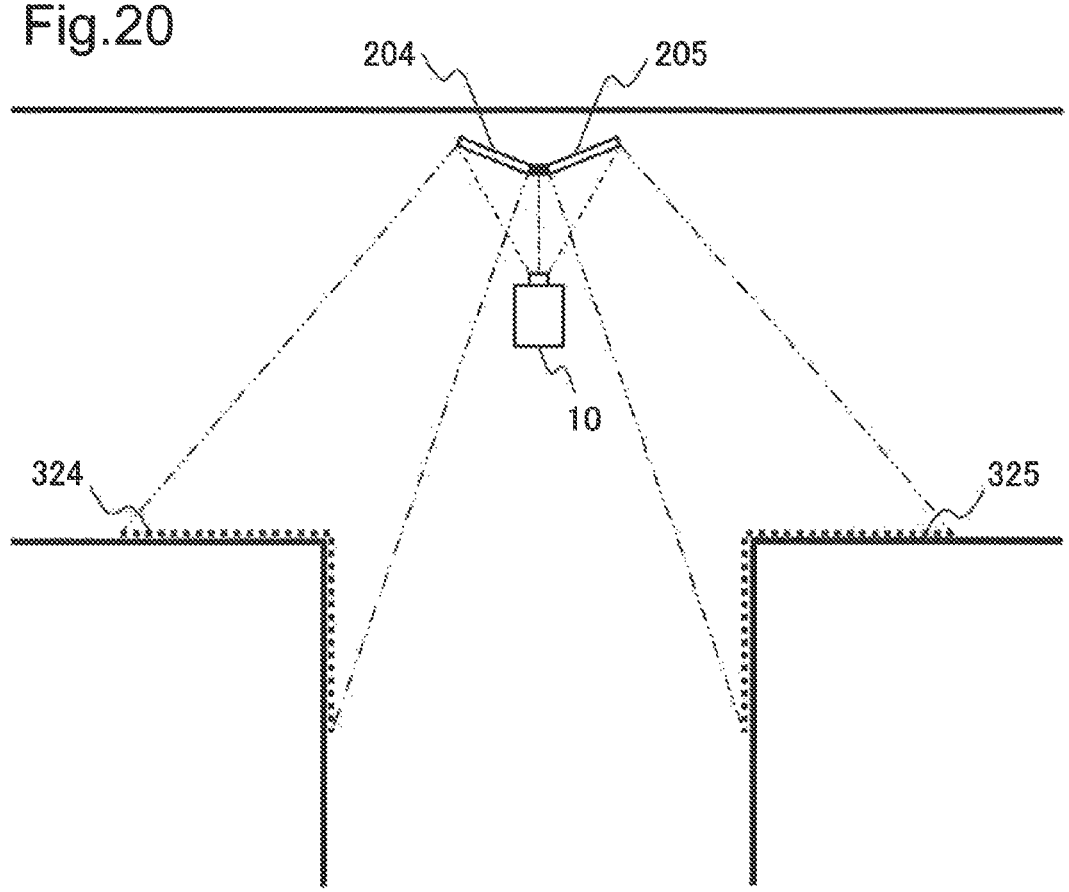
FIG. 20 is a conceptual view illustrating an example in which light projected from a projector of the projection system according to the second example embodiment of the present invention is reflected by the reflecting mirror.

FIG. 20 is a conceptual view for explaining the path of projected light reflected by the mirrors 204 and 205, in the perspective of FIG. 18. The second mirror of the projection system 2 is formed by the mirrors 204 and 205 that reflect in different directions.

Light reflected by the mirror 204 is projected on the display area 324, and part (second display information A) of second display information is displayed on the display area 324. Light reflected by the mirror 205 is projected on the display area 325, and part (second display information B) of the second display information is displayed on the display area 325.

Figure 21:
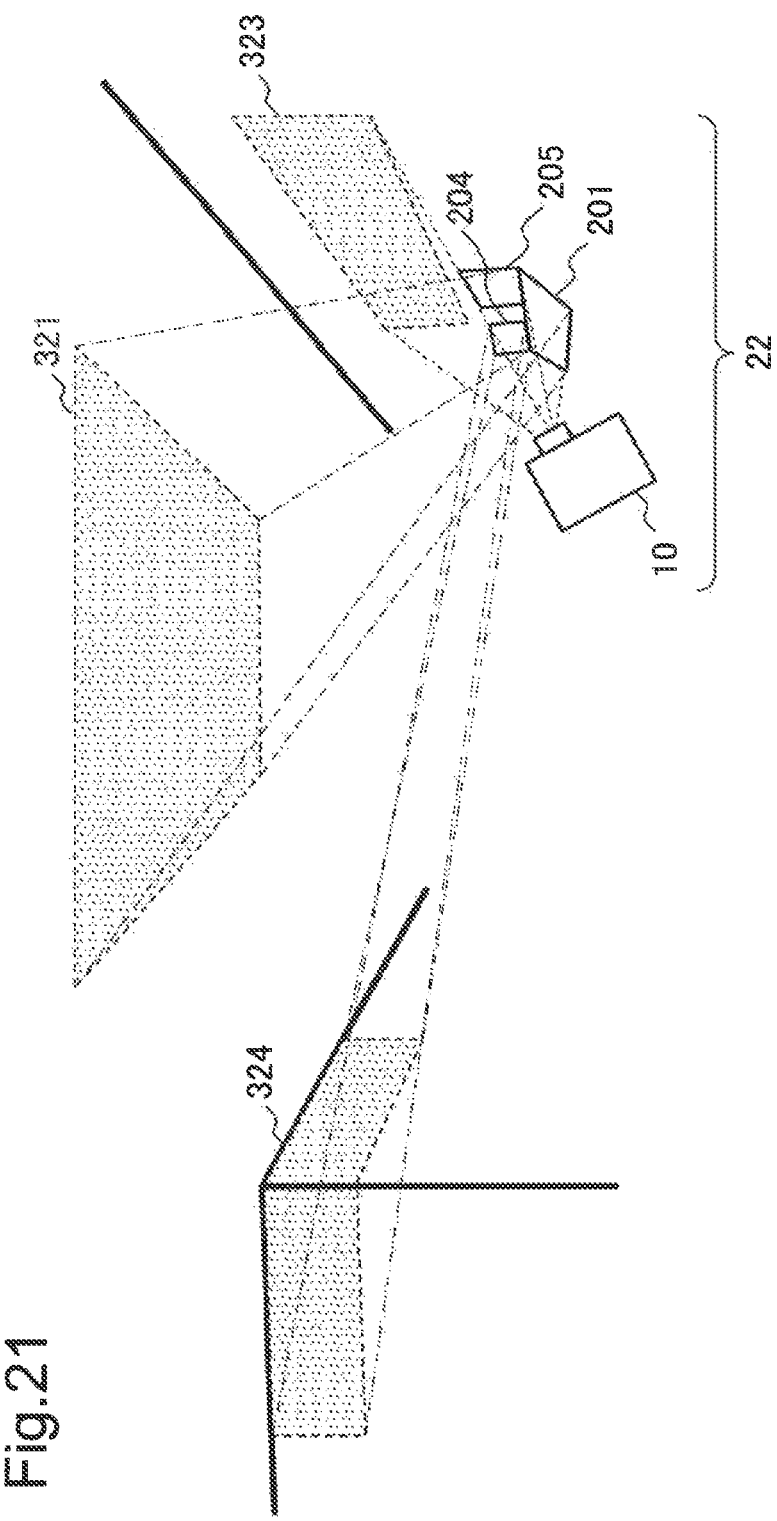
FIG. 21 is a conceptual view illustrating an exemplary layout and projection of the projection system according to the second example embodiment of the present invention.

FIG. 21 is a conceptual view illustrating the projection system 2 mounted at a T-junction as illustrated in FIG. 17, when viewed obliquely upwards. Note that FIG. 21 depicts how the mirror 204 reflects, and does not depict how the mirror 205 reflects.

As described above, according to this example embodiment, the second mirror is formed by two mirrors that reflect in different directions. Therefore, the projection system according to this example embodiment can project projected light in a larger number of directions than the projection system according to the first example embodiment and, in turn, can display, display information on a larger number of wall surfaces.

Figure 22:
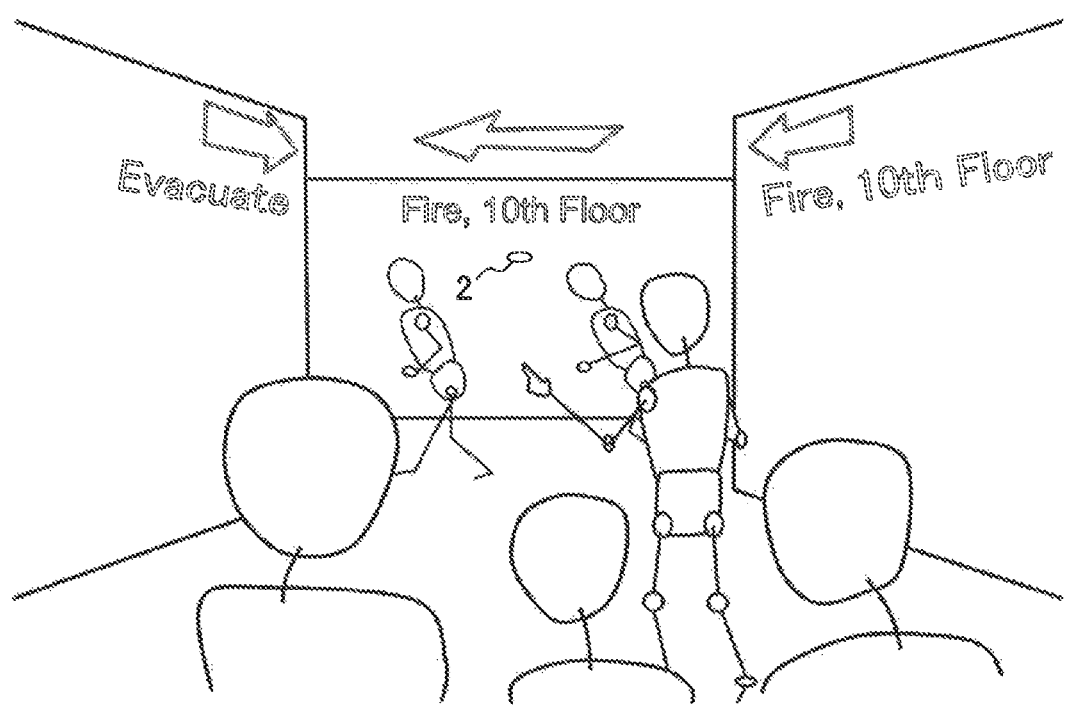
FIG. 22 is a conceptual view illustrating another exemplary usage scene of the projection system according to the second example embodiment of the present invention.

FIG. 22 is a conceptual view illustrating a usage scene in which the projection system 2 mounted at a position identical to that in FIG. 17 is applied to evacuation at the time of disaster. The use of the projection system 2 allows simultaneous display of display information free from distortion on a plurality of display areas by a single device. Note that FIG. 22 depicts conceptual display information displayed on each display area, and does not accurately depict, for example, the orientations, the sizes, the display positions, and the details of the display information.

Figure 23:
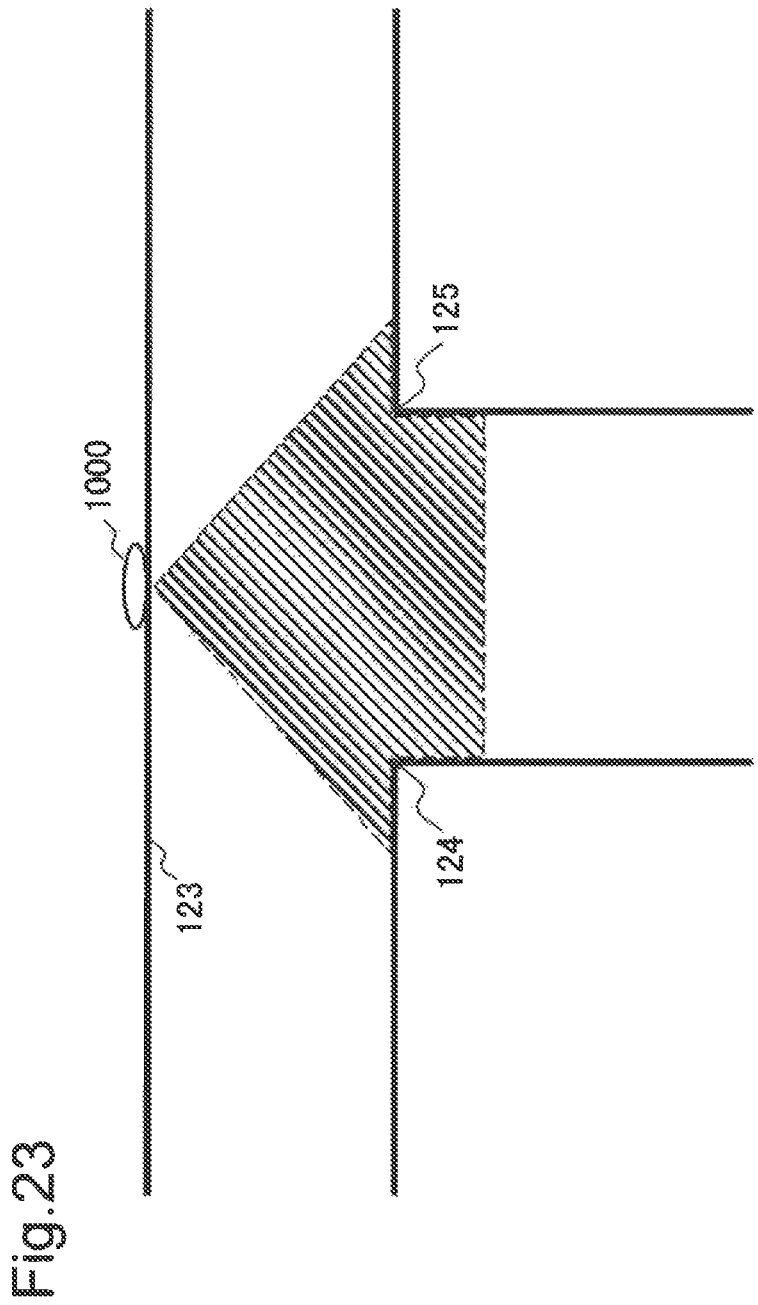
FIG. 23 is a conceptual view illustrating an exemplary mounting position and projection areas of a general projector.

FIG. 23 illustrates an example in which display information is projected using a general projection system 1000. A display area for the general projection system 1000 is filled with hatched lines in FIG. 23. Since light is uniformly projected on the display area illustrated in FIG. 23, excess energy is required by the amount of light projected in a portion where no display information is displayed. In addition, since the general projection system 1000 performs projection in only one direction, another projection system 1000 needs to be used to display, display information on the wall 123 at the end of the T-junction. Moreover, since a projection area needs to be widened to an unnecessary range to widen display information, the display information has considerable distortion, thus degrading the resolution.

The projection system according to this example embodiment can project sufficiently bright display information in a plurality of directions without distortion even when no external power supply is used. Therefore, in a usage scene as illustrated in FIG. 22, a user can be evacuated to a safe place by providing him or her with highly visible display information without mounting a device that may hamper his or her evacuation in a pathway.

Third Example Embodiment

A projection system 3 according to a third example embodiment of the present invention will be described next. The first and second example embodiments and this example embodiment are identical to each other in terms of the configurations of a projector and a controller, but they are different from each other in terms of the structure of a reflecting mirror.

Figure 24:
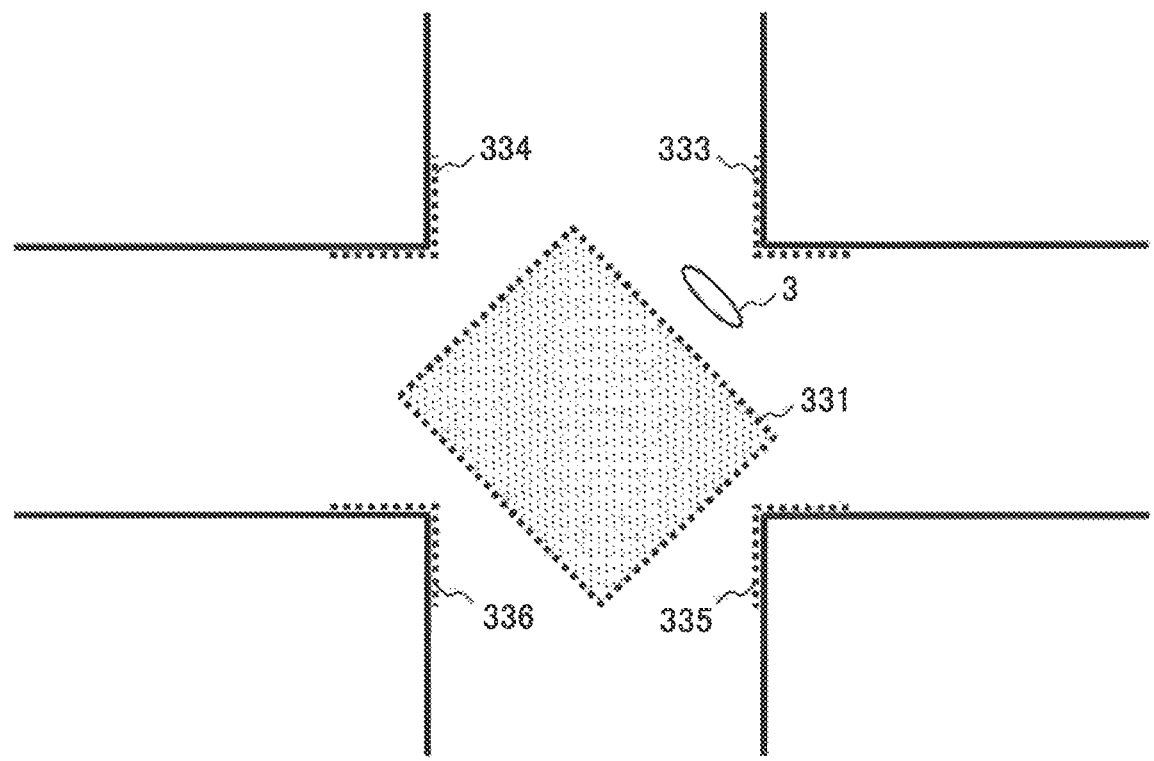
FIG. 24 is a conceptual view illustrating an exemplary mounting position and projection areas of a projection system according to a third example embodiment of the present invention.

In this example embodiment, the projection system 3 is mounted at a crossroad. FIG. 24 is a view illustrating a crossroad where the projection system 3 is mounted, when viewed from above. In the example illustrated in FIG. 24, the projection system 3 is mounted near one (upper right wall corner) of wall corners constituting the crossroad.

The projection system 3 displays display information on a display area 331 on a ceiling, a display area 333 at an upper right wall corner, a display area 334 at an upper left wall corner, a display area 335 at a lower right wall corner, and a display area 336 at a lower left wall corner.

Figure 25:
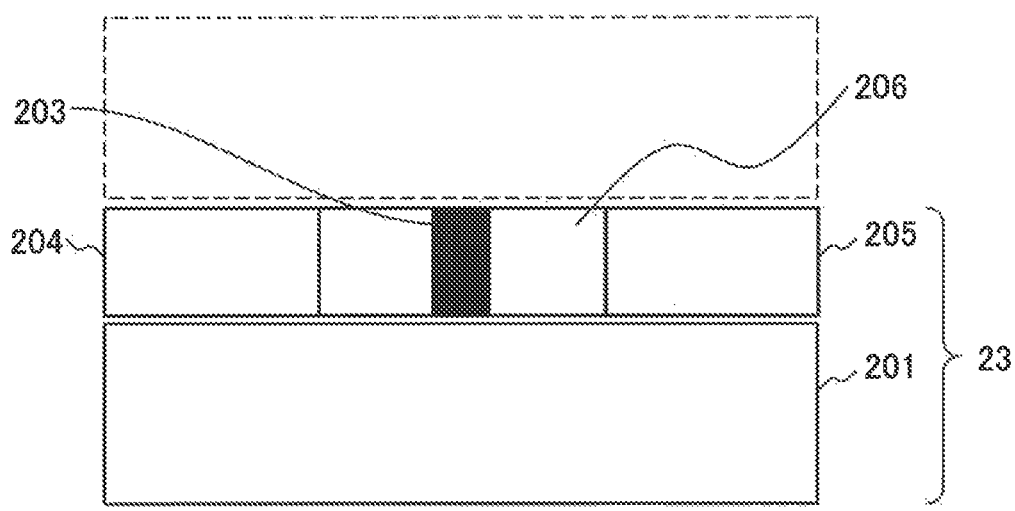
FIG. 25 is a conceptual view illustrating an exemplary arrangement of a reflecting mirror of the projection system according to the third example embodiment of the present invention.

FIG. 25 illustrates an exemplary arrangement of a reflecting mirror 23 of the projection system 3 according to this example embodiment. A first mirror 201 of the reflecting mirror 23 is identical to the first mirrors 201 of the projection systems 1 and 2. The projection system 3 includes a mirror 206 as well as the mirrors 204 and 205 constituting the second mirror of the projection system 2. In this example embodiment, the mirrors 204, 205, and 206 are combined together to divide the reflection direction of the second mirror into three different directions. Note that FIG. 25 illustrates merely an example, and does not limit the arrangement of the reflecting mirror 23 according to this example embodiment. Referring to FIG. 25, a zeroth-order light shielding unit 203 is located in the plane of the mirror 206.

Figure 26:
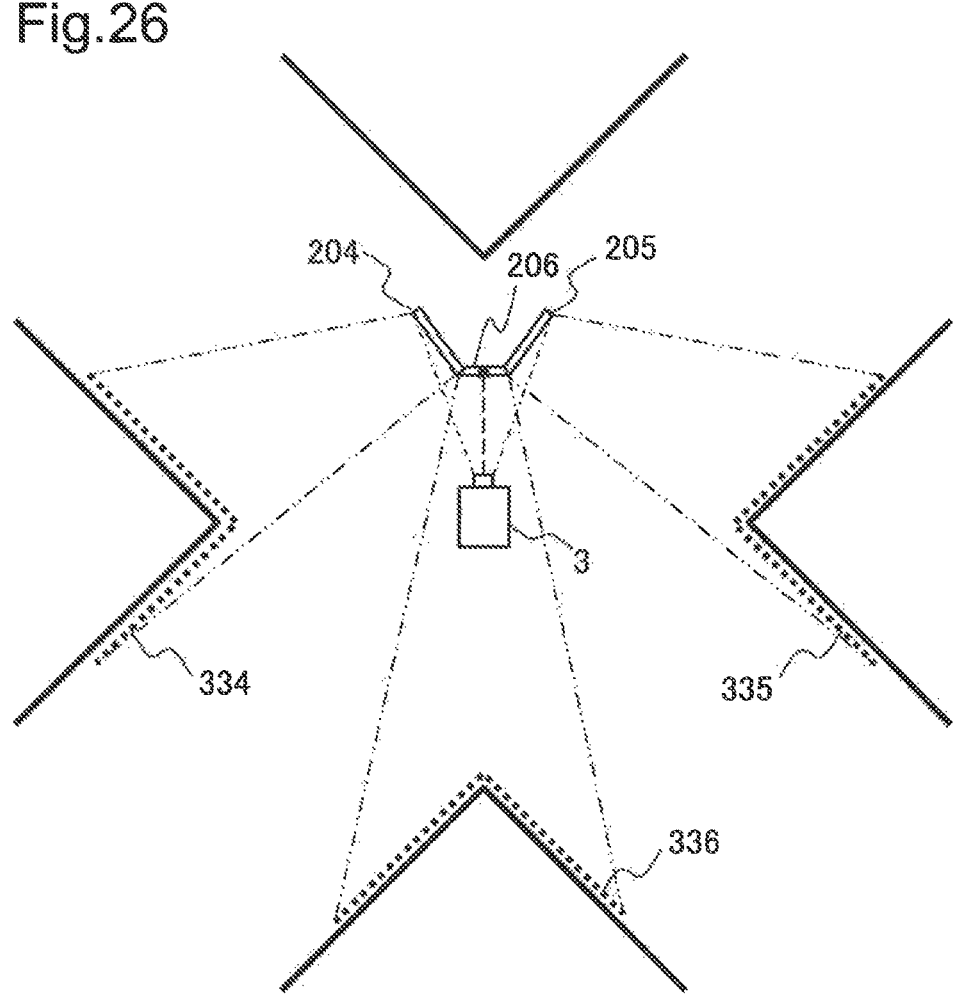
FIG. 26 is a conceptual view illustrating an example in which light projected from a projector of the projection system according to the third example embodiment of the present invention is reflected by the reflecting mirror.

FIG. 26 is a conceptual view for explaining the path of projected light reflected by the mirrors 204, 205, and 206, in the perspective of FIG. 14. The second mirror of the projection system 3 is formed by combining together the mirrors 204, 205, and 206 that reflect in different directions.

Light reflected by the mirror 204 is projected on the display area 334, and part (second display information A) of second display information is displayed on the display area 334. Light reflected by the mirror 205 is projected on the display area 335, and part (second display information B) of the second display information is displayed on the display area 335. Light reflected by the mirror 206 is projected on the display area 336, and part (second display information C) of the second display information is displayed on the display area 336.

As described above, according to this example embodiment, the reflecting mirror is formed by three mirrors that reflect in different directions. Therefore, the projection system according to this example embodiment can project projected light in a larger number of directions than the projection systems according to the first and second example embodiments and, in turn, can display, display information on a larger number of wall surfaces or ceilings.

Figure 27:
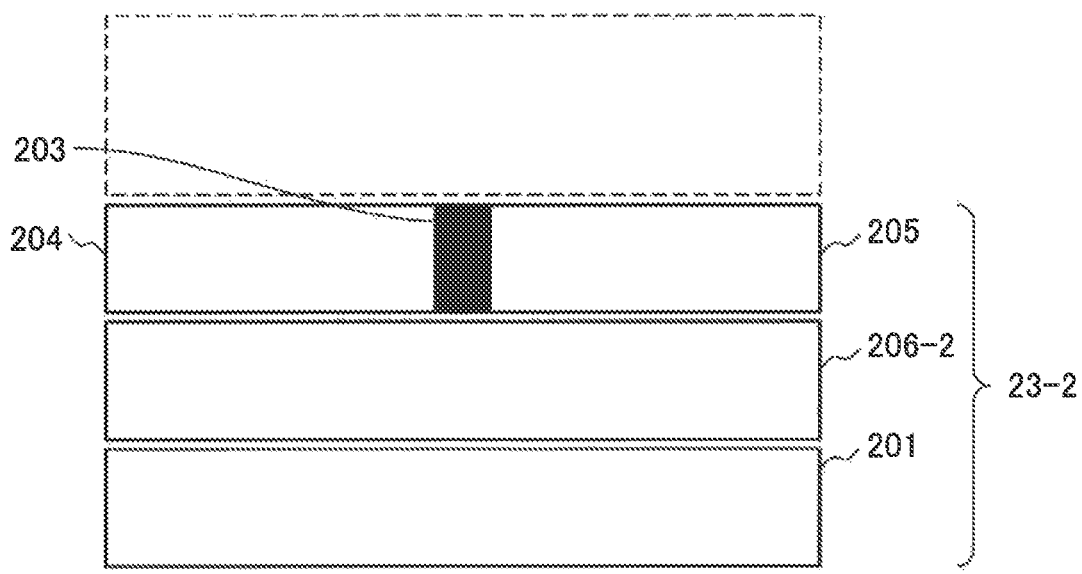
FIG. 27 is a conceptual view illustrating another exemplary arrangement of the reflecting mirror of the projection system according to the third example embodiment of the present invention.

FIG. 27 is a conceptual view illustrating a Modification (a reflecting mirror 23-2) of the reflecting mirror 23 constituting the projection system according to this example embodiment. The reflecting mirror 23-2 is formed not by dividing the second mirror, but by adding a third mirror (a mirror 206-2).

Light reflected by the mirror 204 is projected on the display area 334, and part (second display information A) of second display information is displayed on the display area 334. Light reflected by the mirror 205 is projected on the display area 335, and part (second display information B) of the second display information is displayed on the display area 335. Light reflected by the mirror 206-2 is projected on the display area 336, and part (second display information C) of the second display information is displayed on the display area 336.

Projected light can be reflected in a larger number of directions by dividing the first mirror 201 or the second mirror 202 or adding a mirror, like this example embodiment. The reflection direction of projected light may be set in accordance with the mounting position of the projection system.

Fourth Example Embodiment

A projection system 4 according to a fourth example embodiment of the present invention will be described next. The first to third example embodiments and this example embodiment are identical to each other in terms of the configurations of a projector and a controller, but they are different from each other in terms of the structure of a reflecting mirror.

Figure 28:
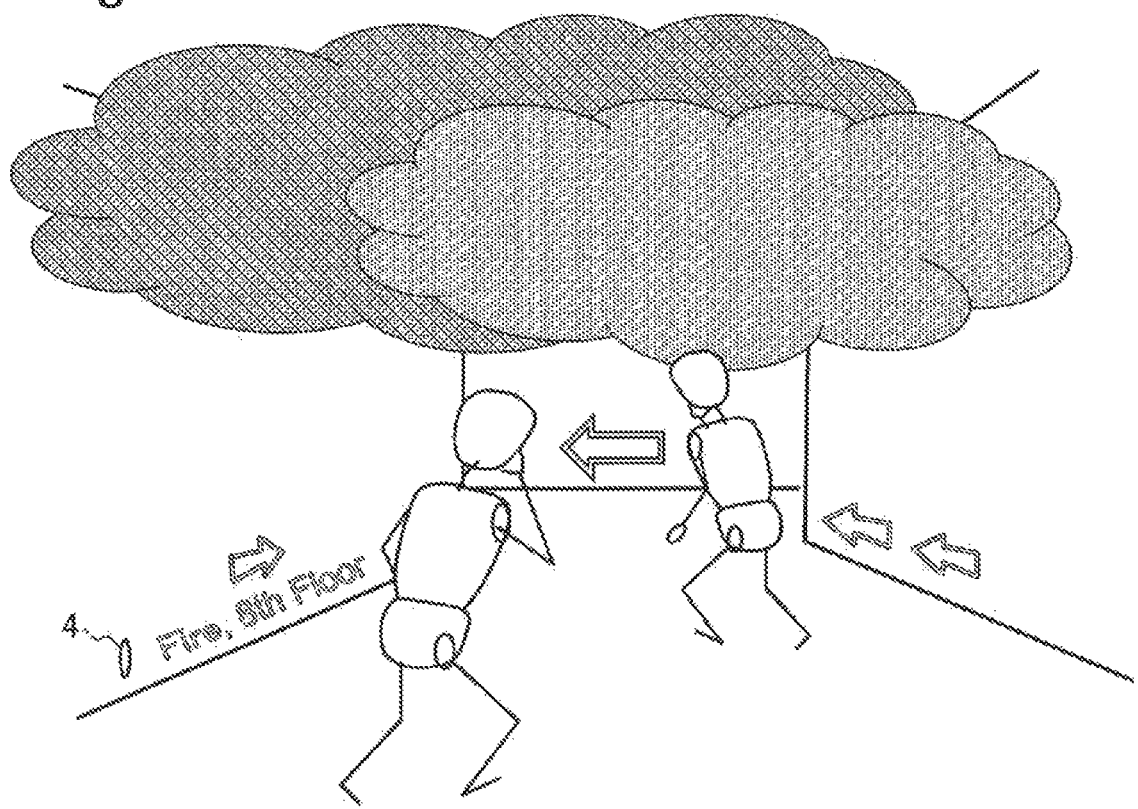
FIG. 28 is a conceptual view illustrating another exemplary usage scene of a projection system according to a fourth example embodiment of the present invention.

FIG. 28 is a conceptual view illustrating the imagery of a fire that has happened in a public facility such as a hotel. Since smoke coming out of the fire collects on the upper side, display information often becomes visually unperceivable when the projection system is mounted on the upper side or the projection direction is set upward. Therefore, in this example embodiment, display information is displayed at the feet by mounting the projection system 4 at the feet. Note that FIG. 28 depicts conceptual display information displayed on each display area, and does not accurately depict, for example, the orientations, the sizes, the display positions, and the details of the display information.

Figure 29:
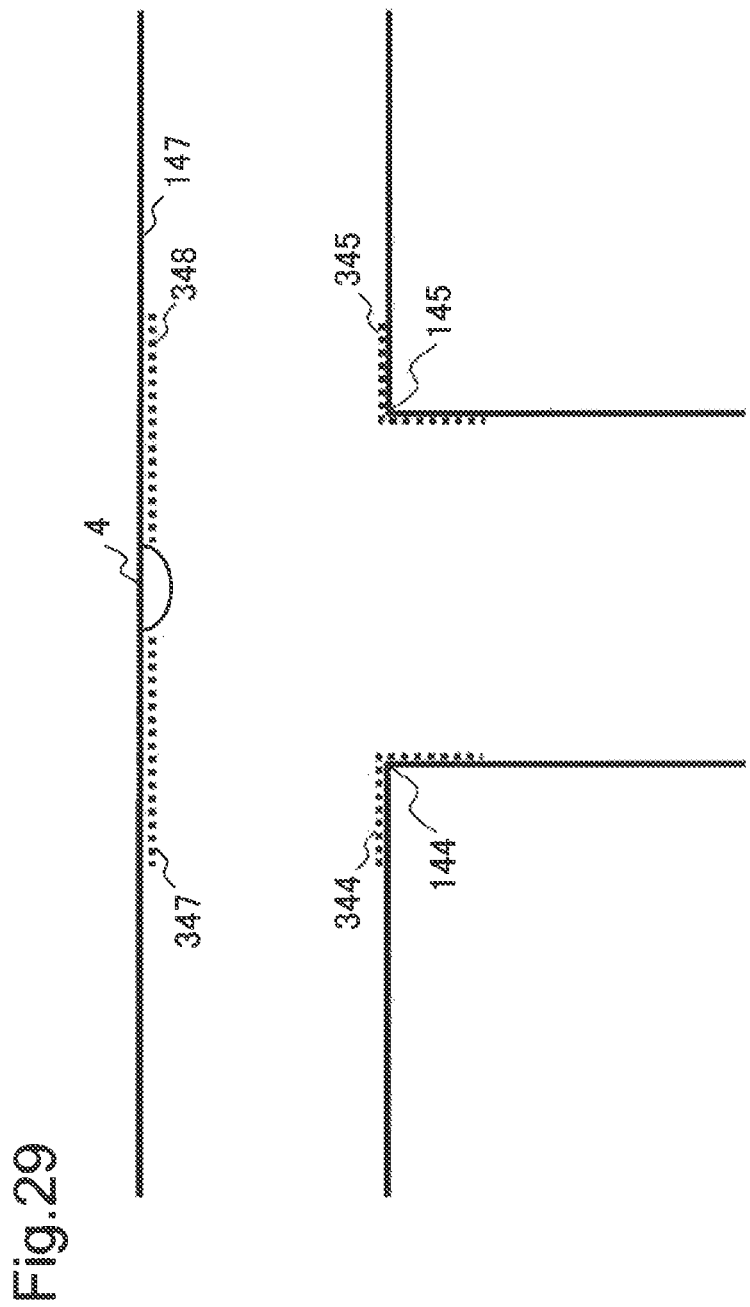
FIG. 29 is a conceptual view illustrating an exemplary mounting position and projection areas of the projection system according to the fourth example embodiment of the present invention.

FIG. 29 is a view illustrating a T-junction where the projection system 4 is mounted, when viewed from above. In the example illustrated in FIG. 29, the projection system 4 is mounted to protrude from a wall 147 at the end of the T-junction.

The projection system 4 displays display information on a display area 344 at a lower left wall corner 144, a display area 345 at a lower right wall corner 145, and display areas 347 and 348 on the wall 147 at the end. In this example embodiment, display information is displayed near the lower corners of walls opposed to the wall 147 at the end by projecting projected light toward the wall corners 144 and 145. In addition, in this example embodiment, display information is displayed on the display areas 347 and 348 by projecting projected light toward the two sides of the projection system 4.

Figure 30:
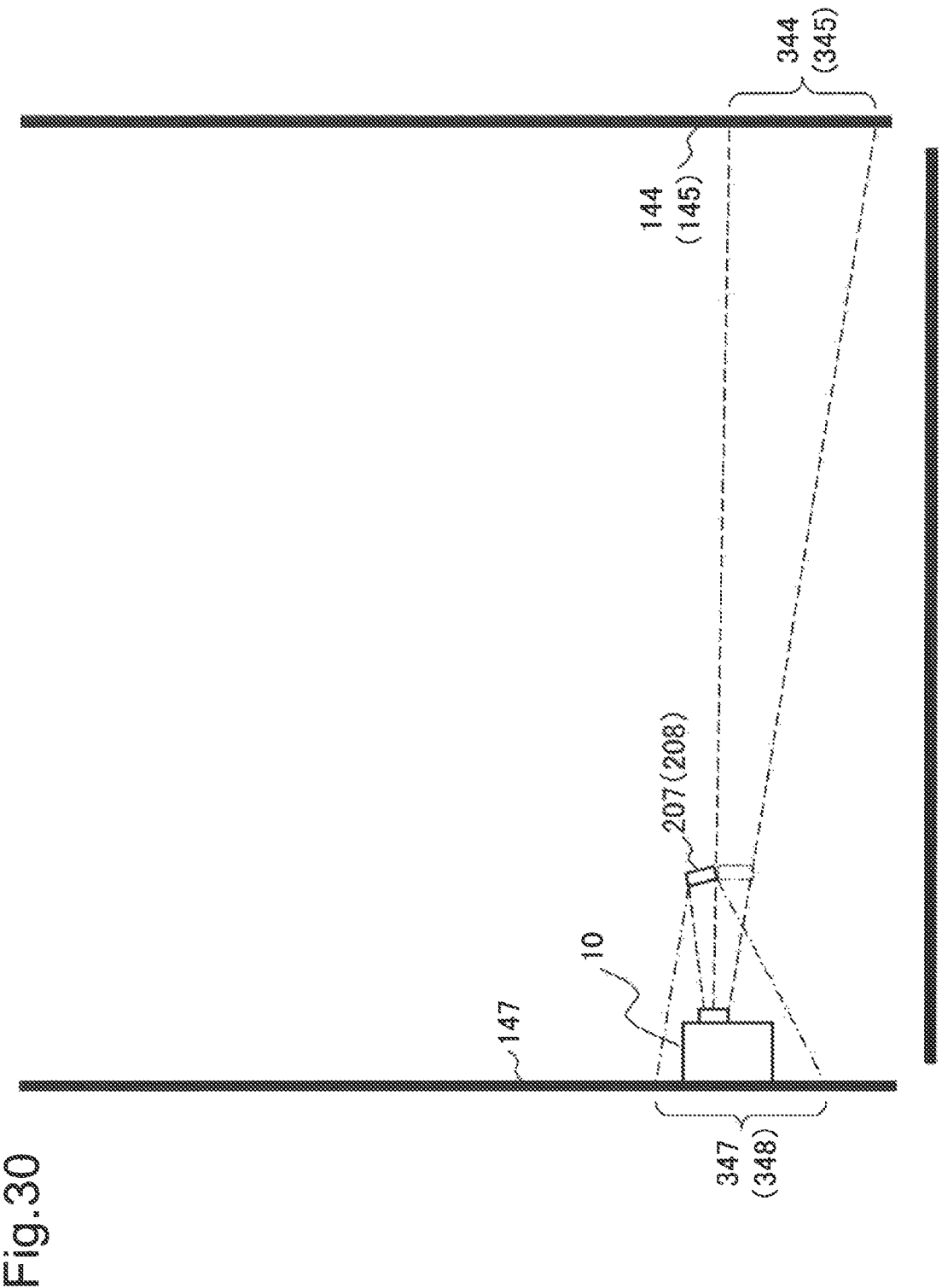
FIG. 30 is a conceptual view illustrating an example in which light projected from a projector of the projection system according to the fourth example embodiment of the present invention is reflected by a reflecting mirror.
Figure 31:
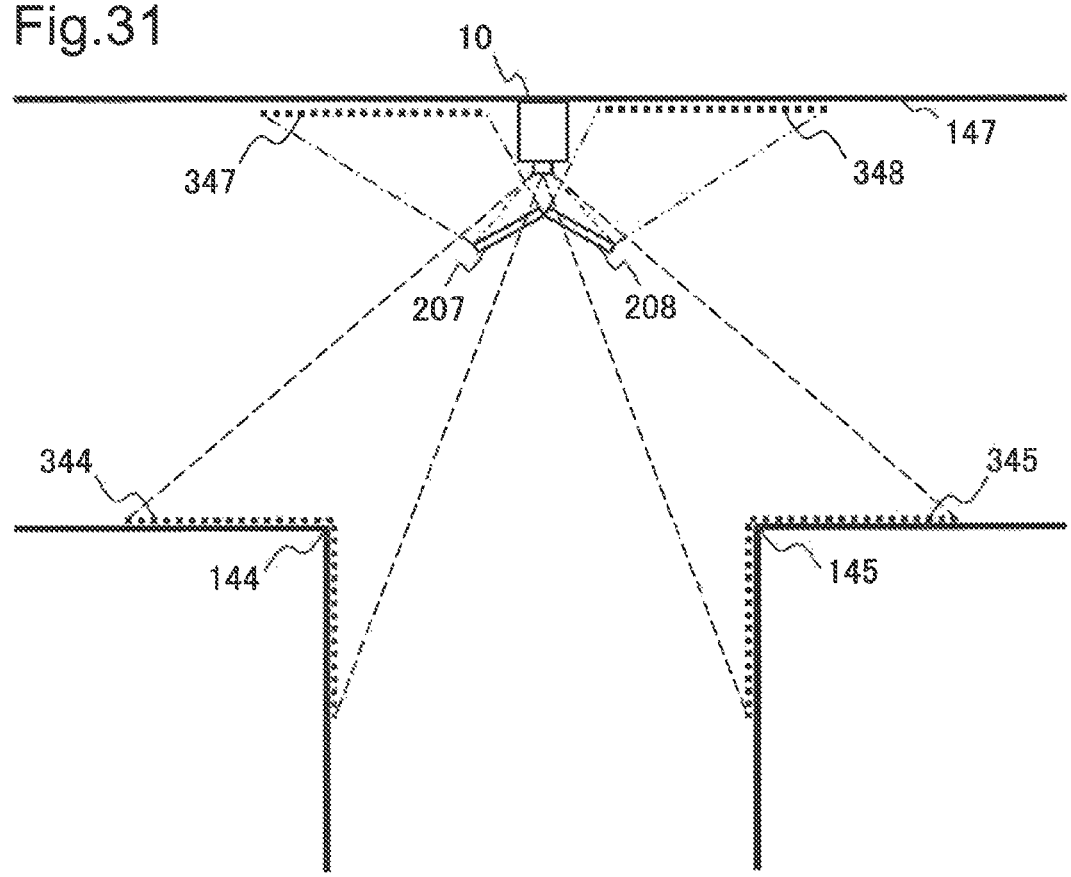
FIG. 31 is a conceptual view illustrating the example in which light projected from the projector of the projection system according to the fourth example embodiment of the present invention is reflected by the reflecting mirror.

FIGS. 30 and 31 are conceptual views illustrating the arrangement of a mirror and the path of light when light is projected from the wall 147 toward the wall corners 144 and 145. FIG. 30 is a view when viewed sideways, and FIG. 31 is a view when viewed from above.

Radiated light from a projector 10 is applied toward the reflecting surface of a mirror 207 or 208 and also applied in a direction deviating from the two mirrors, as illustrated in FIG. 30. Projected light reflected by the mirror 207 is projected toward the display area 347, and projected light reflected by the mirror 208 is projected toward the display area 348. Radiated light applied in a direction deviating from either mirror is projected toward the display area 344 or 345.

The reflecting surfaces of the mirrors 207 and 208 are combined together in such a way that they are irradiated with radiated light from the projector 10 at different angles to reflect projected light in different directions, as illustrated in FIG. 31. As a result, projected light reflected by the mirror 207 is projected toward the display area 347, and projected light reflected by the mirror 208 is projected toward the display area 348. In the example illustrated in FIG. 31, the mirror 207 corresponds to a first mirror, and the mirror 208 corresponds to a second mirror.

Light projected toward the display areas 344 and 345 may be controlled in direction by changing the pattern to be displayed on a display part of a spatial light modulator element 13. Display information may be set to be displayed on a floor surface using an area that is not used in the arrangements illustrated in FIGS. 30 and 31.

According to this example embodiment, display information can be displayed at the feet by mounting the projection system at the feet. Therefore, in a situation in which the user's field of vision is obstructed in the vicinity of a ceiling because of, for example, a fire, the user can be guided by the display information projected at the feet. As long as the projection system according to any of the first to third example embodiments and the projection system according to the fourth example embodiment are mounted in combination, the user can be reliably guided to a destination both in the normal state and at the time of disaster.

Figure 32:
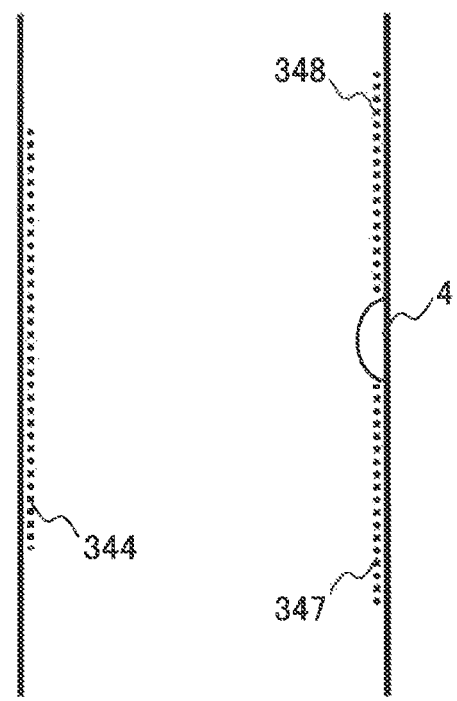
FIG. 32 is a conceptual view illustrating another exemplary mounting position and projection areas of the projection system according to the fourth example embodiment of the present invention.
Figure 33:
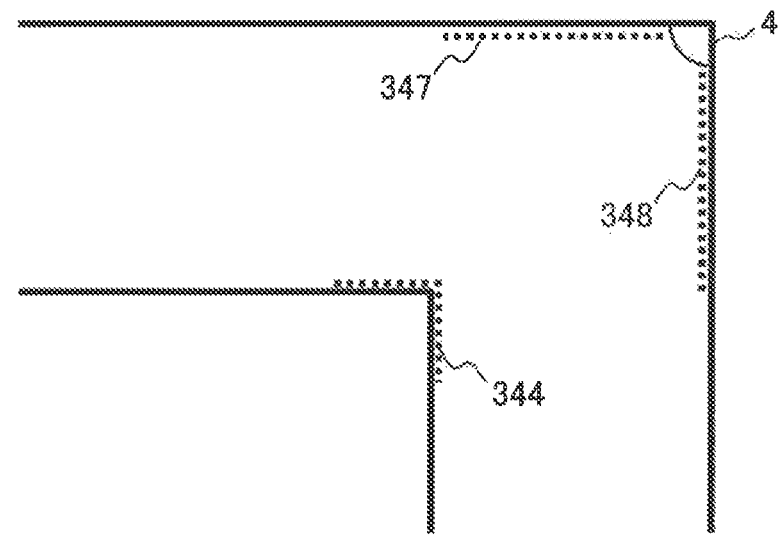
FIG. 33 is a conceptual view illustrating still another exemplary mounting position and projection areas of the projection system according to the fourth example embodiment of the present invention.
Figure 34:
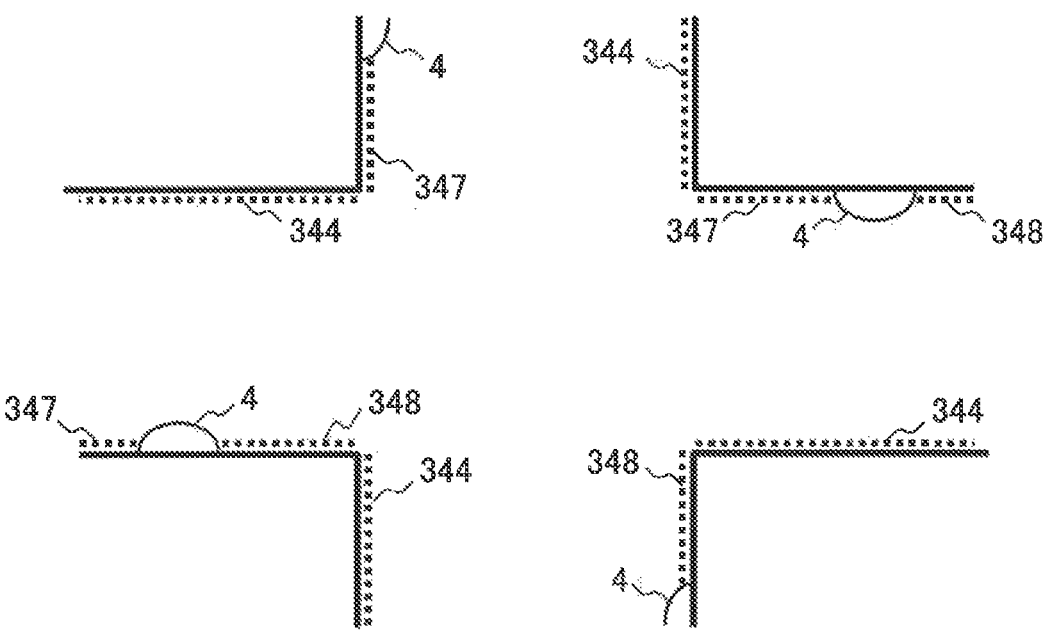
FIG. 34 is a conceptual view illustrating still another exemplary mounting position and projection areas of the projection system according to the fourth example embodiment of the present invention.

FIGS. 32 to 34 illustrate exemplary layouts of the projection system according to this example embodiment. The projection system is mounted in the straight portion of a pathway in the example illustrated in FIG. 32, at the corner portion of a pathway in the example illustrated in FIG. 33, and in each of portions constituting a crossroad of a pathway in the example illustrated in FIG. 34. At any of these mounting positions, the projection system according to this example embodiment can display desired display information on an appropriate display area with no problem.

Fifth Example Embodiment

An interface device 50 according to a fifth example embodiment will be described next. The interface device 50 according to this example embodiment is formed by combining the projection system according to any of the first to fourth example embodiments with a camera.

Figure 35:
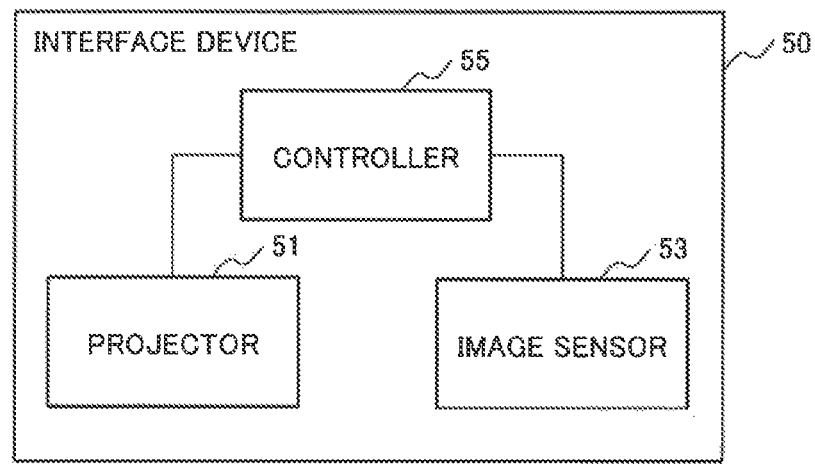
FIG. 35 is a block diagram illustrating the configuration of an interface device of a projection system according to a fifth example embodiment of the present invention.

FIG. 35 is a block diagram illustrating the configuration of the interface device 50 according to this example embodiment. The interface device 50 includes a projector 51, an image sensor 53, and a controller 55. The projector 51 is implemented in any of the projection systems 1 to 4 according to the first to fourth example embodiments. The image sensor 53 serves as a camera having the image sensing function. The controller 55 controls the projector 51 and the image sensor 53.

Figure 36:
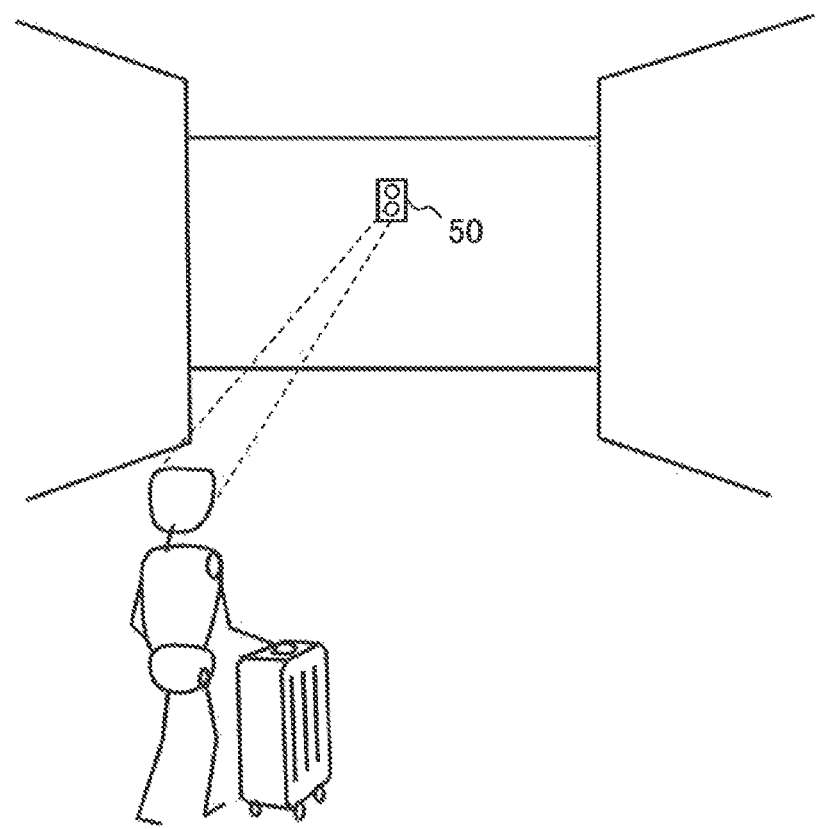
FIG. 36 is a conceptual view illustrating a usage scene of the projection system according to the fifth example embodiment of the present invention.
Figure 37:
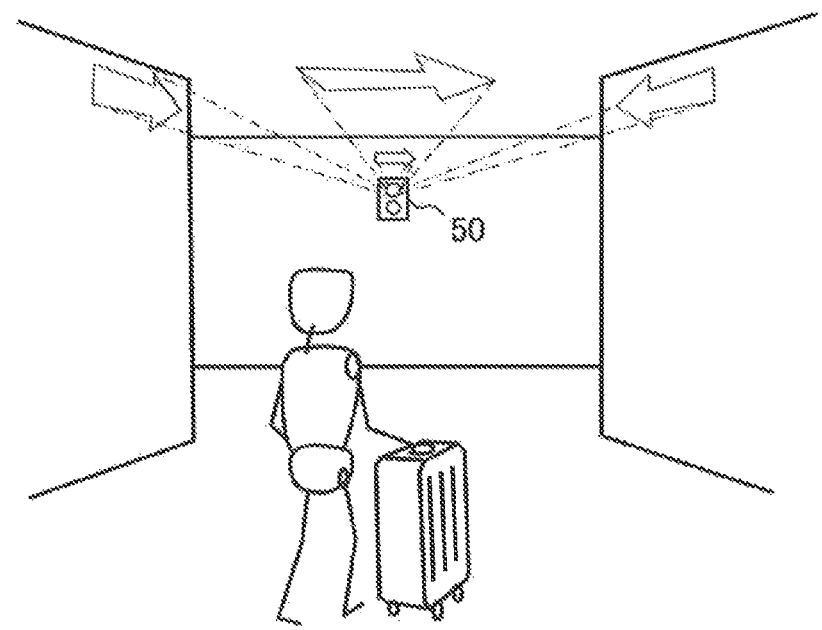
FIG. 37 is a conceptual view illustrating another usage scene of the projection system according to the fifth example embodiment of the present invention.

FIGS. 36 and 37 illustrate an exemplary usage scene of the interface device 50. For example, the interface device 50 can be mounted at the window in a public facility such as a hotel.

The interface device 50 captures a predetermined image sensing area and analyzes image sensing data obtained by capturing the image sensing area, as illustrated in FIG. 36.

When the interface device 50 recognizes a particular user in the image sensing area as a result of analyzing the image sensing data, it displays display information to be visually perceived by the particular user on a predetermined display area as illustrated in FIG. 37. The user can know specific information by visually perceiving the display information displayed as illustrated in FIG. 37 and understanding its details. In the example illustrated in FIG. 37, a user walking toward a T-junction can recognize display information displayed on a ceiling and walls and know specific information indicating that the user can reach his or her destination when he or she turns to the right at the end. Note that FIG. 37 depicts conceptual display information displayed on each display area, and does not accurately depict, for example, the orientations, the sizes, the display positions, and the details of the display information.

The configuration of the interface device 50 illustrated in FIG. 35 will be described in detail herein with reference to FIGS. 38 and 39.

Figure 38:
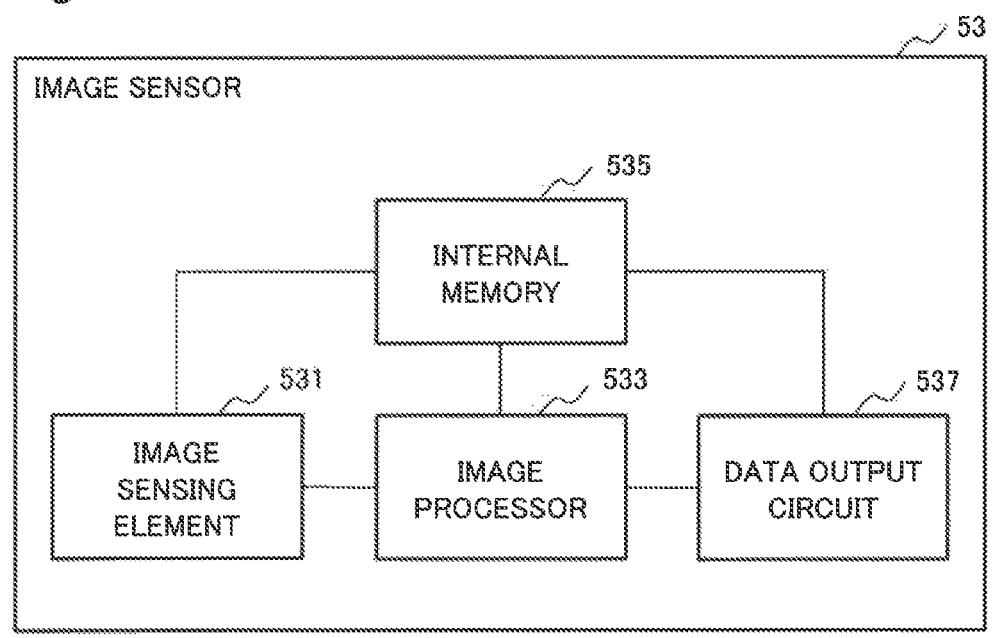
FIG. 38 is a block diagram illustrating the configuration of an image sensor of the projection system according to the fifth example embodiment of the present invention.

FIG. 38 is a block diagram illustrating the configuration of the image sensor 53. The image sensor 53 includes an image sensing element 531, an image processor 533, an internal memory 535, and a data output circuit 537.

The image sensing element 531 is used to capture a predetermined image sensing area and acquire image sensing data of the image sensing area. The image sensing element 531 serves as a photoelectric conversion element formed by an integrated circuit of semiconductor parts. The image sensing element 531 can be implemented as a solid-state image sensing element such as a charge-coupled device (CCD) or a complementary metal-oxide-semiconductor (CMOS). Generally, the image sensing element 531 is implemented as an element that captures light in the visible range, but may also be implemented as an element that can capture and detect electromagnetic waves such as infrared rays, ultraviolet rays, X-rays, gamma rays, radio waves, or microwaves.

The image processor 533 serves as an integrated circuit that performs image processing such as dark current correction, interpolation operation, color space conversion, gamma correction, aberration correction, noise reduction, and image compression on the image sensing data captured by the image sensing element 531. When image information is output without processing, the image processor 533 may be omitted.

The internal memory 535 serves as a storage element that temporarily stores image information remaining to be processed and processed image information, in image processing by the image processor 533. The image information captured by the image sensing element 531 may also be temporarily stored in the internal memory 535. The internal memory 535 may be implemented as a general memory.

The data output circuit 537 outputs the image information processed by the image processor 533 to the controller 55.

Figure 39:
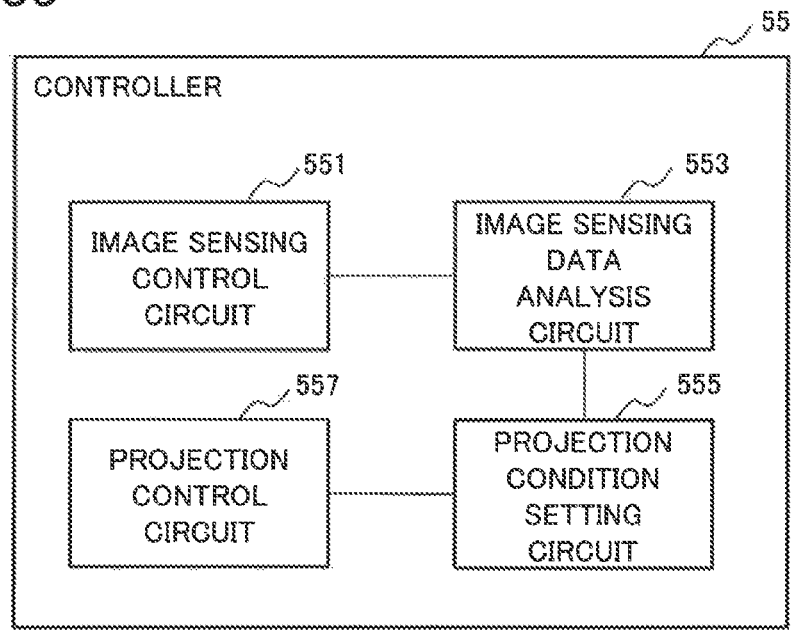
FIG. 39 is a block diagram illustrating the configuration of a controller of the projection system according to the fifth example embodiment of the present invention.

FIG. 39 is a block diagram illustrating the configuration of the controller 55. The controller 55 includes an image sensing control circuit 551, an image sensing data analysis circuit 553, a projection condition setting circuit 555, and a projection control circuit 557. The controller 55 may have the function of communication with a host system (not illustrated). The following description assumes that the interface device 50 performs processing by communication with the host system.

The image sensing control circuit 551 performs, for example, control for causing the image sensor 53 to capture the image sensing area, in response to an instruction from the host system. The image sensing control circuit 551 outputs image sensing data captured by the image sensor 53 to the image sensing data analysis circuit 553. An instruction for acquiring image sensing data may also be issued from the image sensing data analysis circuit 553 to the image sensing control circuit 551.

The image sensing data analysis circuit 553 analyzes the image sensing data. For example, the image sensing data analysis circuit 553 analyzes whether a user to visually perceive display information is included in the image sensing data.

When a particular user is recognized in the image sensing data, the image sensing data analysis circuit 553 notifies the projection condition setting circuit 555 that the particular user has been recognized.

The projection condition setting circuit 555 stores a pattern corresponding to the display information to be visually perceived by the particular user. The projection condition setting circuit 555 outputs projection conditions including the pattern corresponding to the display information to be visually perceived by the particular user to the projection control circuit 557, based on the notification from the image sensing data analysis circuit 553.

The projection control circuit 557 acquires the projection conditions output from the projection condition setting circuit 555 and outputs the projection conditions to the projector 51.

The projector 51 displays desired display information on an appropriate display area, based on the projection conditions acquired from the controller 55.

As described above, with the interface device according to this example embodiment, a particular user can be recognized by analyzing image sensing data acquired by the image sensor, and information to be provided to the particular user can be displayed on a display area easy for him or her to visually perceive.

The use of the interface device according to this example embodiment can construct a system capable of reliably guiding a user who has checked in at a hotel to his or her room, like the projection systems according to the first to fourth example embodiments. Assume, for example, that a plurality of interface devices are mounted in spaces inside the hotel, such as a front desk, a lobby, or a corridor. In this case, since the interface devices themselves have the image sensing function, cameras can be omitted.

When the user approaches, the interface device displays appropriate display information on, for example, a wall, a ceiling, or a floor easy for the user to visually perceive. When the user is guided to his or her room, display information such as a room number and an arrow can be displayed, as illustrated in FIG. 7 or 17. In a case as illustrated in FIG. 22 or 28, display information for evacuating the user to a safe place can be displayed. The user can know appropriate information by visually perceiving the display information displayed on, for example, a wall, a ceiling, or a floor.

When, for example, a plurality of interface devices are collectively managed by a server, a device that displays display information can be appropriately selected by making the plurality of interface devices cooperate with each other and repeating acquisition and estimation of user's positional information. When cameras that can cooperate with the interface devices are mounted, the user's positional information can be more reliably updated.

Sixth Example Embodiment

A display 60 according to a sixth example embodiment will be described next. The display 60 according to this example embodiment has the function of the interface device 50 according to the fifth example embodiment and provides information to a user. The display 60 also functions as an interface device that receives an operation by the user.

Figure 40:
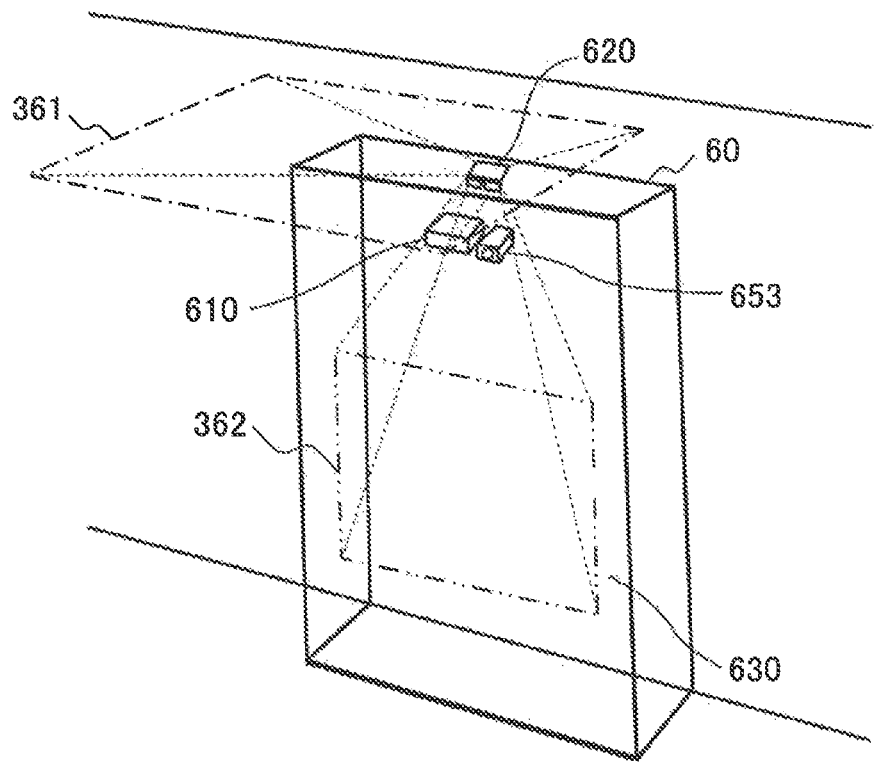
FIG. 40 is a conceptual view illustrating an exemplary arrangement of a display according to a sixth example embodiment of the present invention.

FIG. 40 is a conceptual view illustrating the arrangement of the display 60. The display 60 includes a projector 610, a reflecting mirror 620, a display surface 630, and a camera 653. However, the display 60 may include no camera 653 when the interface function is omitted.

The projector 610 has a configuration similar to that of the projector 10 according to the first to fourth example embodiments. The reflecting mirror 620 has an arrangement similar to that of any of the reflecting mirrors 21 to 24 according to the first to fourth example embodiments. The camera 653 has a configuration similar to that of the image sensor 53 according to the fifth example embodiment. The display 60 also includes a controller (not illustrated) similar to the controller 55 according to the fifth example embodiment. In other words, the display 60 exhibits the function of the interface device 50 according to the fifth example embodiment by the projector 610, the reflecting mirror 620, and the controller (not illustrated).

The projector 610, the reflecting mirror 620, and the controller (not illustrated) are accommodated in a housing having the display surface 630 as its surface. The housing of the display 61 is open on the upper side or transparent, and projected light can be projected to the upper side.

The display surface 630 is made of a transparent plate-like member. As the display surface 630, for example, transparent plastic or glass can be used. The display surface 630 includes, on its interior or surface, a portion (fluorescence generation portion) containing a dispersed fluorescent body that emits fluorescence by scattering the projected light reflected by the reflecting mirror 620. The fluorescence generation portion may spread on the entire display surface 630, or may be placed only on a display area 362 where display information is displayed.

As the display surface 630, for example, a transparent sheet (to be referred to as a transparent fluorescent sheet hereinafter) that contains dispersed fluorescent body which emits a specific fluorescent color by absorbing radiated light can be placed in the display area 362. With this arrangement, the display 60 can be seen through the display area 362. The display surface 630 may also be implemented by covering the surface of, for example, transparent glass with a transparent fluorescent sheet.

As a main ingredient of the transparent fluorescent sheet, for example, a transparent resin containing a polyvinyl acetal typified by polyvinylbutyral (PVB) can be used. However, a material such as plastic or glass having any properties is applicable to the base material of the transparent fluorescent sheet and no limitation is imposed on the material properties, unless it is hard to recognize the fluorescent color emitted by the fluorescent body excited by light having a specific wavelength.

A complex oxide doped with a rare earth, for example, may be dispersed in the transparent fluorescent sheet as a fluorescent body. For example, a fluorescent body doped with a rare earth element such as europium, dysprosium, erbium, cerium, or thulium can be used for a complex oxide such as yttrium aluminum garnet or yttrium vanadate. Compound semiconductor nanoparticles using the property of a quantum dot, in which different types of fluorescence are emitted by controlling the particle size, may also be dispersed in the transparent fluorescent sheet as a fluorescent body. The fluorescent body used for the transparent fluorescent sheet is not limited to the above-described compounds and compositions, as long as it emits a specific fluorescent color upon excitation by light having a specific wavelength.

As a fluorescent body for the transparent fluorescent sheet, a material that is transparent in the visible range and emits fluorescence upon excitation by light having a wavelength other than those in the visible range may also be used. With such an arrangement, since the fluorescent body is transparent in the visible range, the display 60 can be seen through the display surface 630.

Of the projected light reflected by the reflecting mirror 620, a component reflected by the first mirror is projected toward a display area 361 on a ceiling, and a component reflected by the second mirror is projected toward the display area 362 on the display surface 630. As a result, first display information is displayed on the display area 361, and second display information is displayed on the display area 362.

The camera 653 generates image sensing data by capturing the vicinity of the display 60. The controller analyzes the image sensing data generated by the camera 653 and recognizes a user from the image sensing data.

The camera 653 also generates image sensing data by capturing the display area 362 on the display surface 630. The controller recognizes an operation performed by the user on the display information displayed on the display area 362 and controls the projector 610 to display, display information that depends on the operation.

Figure 41:
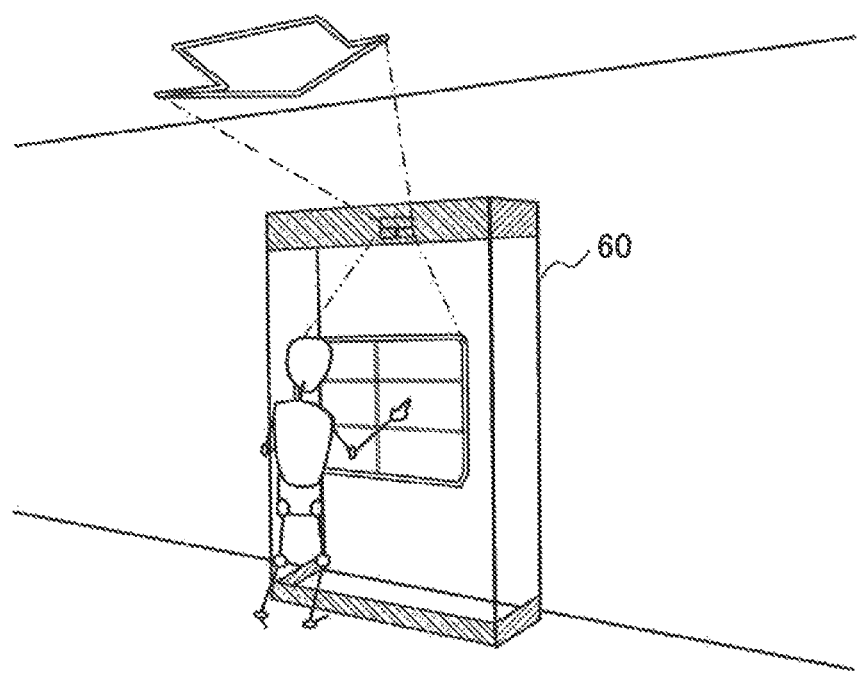
FIG. 41 is a conceptual view illustrating an exemplary layout of the display according to the sixth example embodiment of the present invention.

FIG. 41 illustrates an exemplary layout of the display 60 according to this example embodiment. For example, when the display 60 recognizes a user by the camera 653, the display 60 displays display information for guiding the user to the display 60 on a ceiling. At the stage when the user has approached the display 60, display information necessary for the user is displayed on the display surface 630. The user can know necessary information by looking at the display information displayed on the display surface 630 of the display 60.

When the display information displayed on the display surface 630 includes an operable portion (to be referred to as an operation button hereinafter), as the user operates the operation button, the camera 653 captures the operation by the user. As the controller recognizes the operation by the user, the controller controls the projector 610 to display, display information corresponding to the operation. In this manner, the display 60 functions as an interface device.

As described above, according to this example embodiment, a display that can display, display information in a plurality of directions and accurately notifies the user of desired information can be implemented. Furthermore, according to this example embodiment, a display having an interface function for receiving an operation by a user on the displayed display information and providing display information that depends on the operation by the user can be implemented.

(Hardware)

A hardware configuration for implementing a control system for the projection system according to this example embodiment will be described herein by taking a computer 90 illustrated in FIG. 42 as an example. The computer 90 illustrated in FIG. 42 is an exemplary configuration for implementing the projection system according to each example embodiment, and does not limit the scope of the present invention.

The computer 90 includes a processor 91, a main storage device 92, an auxiliary storage device 93, an input/output interface 95, and a communication interface 96, as illustrated in FIG. 42. Referring to FIG. 42, the interface is abbreviated as an interface (I/F). The processor 91, the main storage device 92, the auxiliary storage device 93, the input/output interface 95, and the communication interface 96 are connected to each other in a data exchangeable manner via a bus 99. The processor 91, the main storage device 92, the auxiliary storage device 93, and the input/output interface 95 are also connected to a network such as the Internet or an intranet via the communication interface 96. The computer 90 is connected to a server or a computer in a host system via the network and acquires, for example, the phase distribution of display information to be projected from the host system.

The processor 91 expands a program stored in the auxiliary storage device 93 or the like onto the main storage device 92 and executes the expanded program. In this example embodiment, a software program installed on the computer 90 need only be used. The processor 91 executes arithmetic processing and control processing performed by the controller according to this example embodiment.

The main storage device 92 includes an area where the program is expanded. The main storage device 92 can be implemented as a volatile memory such as a dynamic random access memory (DRAM). A nonvolatile memory such as a magnetoresistive random access memory (MRAM) may also be used or added as the main storage device 92.

The auxiliary storage device 93 serves as a means for storing data such as the phase distribution of display information. The auxiliary storage device 93 is implemented as a local disk such as a hard disk or a flash memory. The auxiliary storage device 93 can also be omitted by storing the phase distribution of display information in the main storage device 92.

The input/output interface 95 serves as a device that connects the computer 90 to a peripheral device, based on a standard for connection between the computer 90 and the peripheral device. The communication interface 96 is used to establish a connection to a network such as the Internet or an intranet, based on a standard or a specification. The input/output interface 95 and the communication interface 96 may be integrated into a single interface that establishes a connection to an external device.

An input device such as a keyboard, a mouse, or a touch panel may be connectable to the computer 90 as needed. The input devices are used to input information and setting. When a touch panel is used as an input device, the display screen of a display device need only serve as the interface of the input device as well. Data exchange between the processor 91 and the input device need only be mediated by the input/output interface 95.

The communication interface 96 is connected to a host system such as another computer or a server via the network. The host system transmits the phase distribution of the display information used in each example embodiment to the computer 90 via the communication interface 96. The host system may generate by itself the phase distribution of the display information used in each example embodiment, or may acquire it from another device.

A display device for displaying information may also be mounted on the computer 90. When the display device is mounted, the computer 90 preferably includes a display controller (not illustrated) for controlling display on the display device. The display device need only be connected to the computer 90 via the input/output interface 95.

The computer 90 may even be equipped with a reader/writer as needed. The reader/writer is connected to the bus 99 and mediates, for example, reading of data and programs from a recording medium (program recording medium; not illustrated) and writing of the result of processing by the computer 90 onto the recording medium between the processor 91 and the recording medium. The recording medium can be implemented as a semiconductor recording medium such as a secure digital (SD) card or a universal serial bus (USB) memory. The recording medium may also be implemented as a magnetic recording medium such as a flexible disk, an optical recording medium such as a compact disc (CD) or a digital versatile disc (DVD), or other recording media.

An exemplary hardware configuration for enabling the projection system according to the example embodiment of the present invention has been described above. The hardware configuration illustrated in FIG. 42 is merely an exemplary hardware configuration for enabling the projection system according to this example embodiment, and does not limit the scope of the present invention. A projection program for causing a computer to execute processing associated with the projection system according to this example embodiment also falls within the scope of the present invention. A program recording medium recording the projection program according to the example embodiment of the present invention moreover falls within the scope of the present invention.

The present invention has been described above with reference to the above-described example embodiments as exemplary examples. However, the present invention is not limited to the above-described example embodiments. In other words, various modes that would be understood by those skilled in the art are applicable to the present invention within the scope of the present invention.

Part or all of the above-described example embodiments may be described as in the following supplementary notes, but they are not limited thereto.

(Supplementary Note 1)

A projection system including:

a projector including a light source, a phase-modulation-type spatial light modulator element configured to include a display part displaying a pattern corresponding to display information, and modulate and emit light radiated on the display part from the light source, and an optical system that projects modulated light emitted from the spatial light modulator element;

a controller configured to generate a control condition for controlling the light source and the spatial light modulator element, based on a display condition acquired from a host system, the controller configured to control the light source and the spatial light modulator element, based on the generated control condition; and a reflecting mirror configured to reflect projected light from the projector toward a plurality of display areas.

(Supplementary Note 2)

The projection system according to supplementary note 1, wherein the reflecting mirror includes:

a first mirror configured to reflect projected light toward a first display area; and a second mirror configured to reflect projected light toward a second display area.

(Supplementary Note 3)

The projection system according to supplementary note 2, wherein the projector is configured to project a part of projected light toward a position where the first mirror and the second mirror are not placed, and the reflecting mirror passes, toward a third display area, at least a part of projected light projected toward a position where the first mirror and the second mirror are not placed.

(Supplementary Note 4)

The projection system according to supplementary note 3, wherein the reflecting mirror includes a frame having an opening formed to pass light projected on the third display area.

(Supplementary Note 5)

The projection system according to any one of supplementary notes 2 to 4, wherein the second mirror is divided in such a way as to reflect projected light in different directions.

(Supplementary Note 6)

The projection system according to any one of supplementary notes 2 to 5, wherein at least one of the first mirror and the second mirror is a concave mirror.

(Supplementary Note 7)

The projection system according to any one of supplementary notes 2 to 5, wherein at least one of the first mirror and the second mirror is a convex mirror.

(Supplementary Note 8)

The projection system according to any one of supplementary notes 5 to 7, wherein at least one of the first mirror and the second mirror includes an aspherical reflecting surface.

(Supplementary Note 9)

The projection system according to supplementary note 8, wherein at least one of the first mirror and the second mirror includes a freeform reflecting surface.

(Supplementary Note 10)

The projection system according to any one of supplementary notes 2 to 9, wherein the reflecting mirror includes a third mirror that reflects projected light toward a display area different from the first display area and the second display area.

(Supplementary Note 11)

The projection system according to any one of supplementary notes 1 to 10, wherein the reflecting mirror includes a zeroth-order light shielding unit configured to be placed at a position irradiated with zeroth-order light contained in projected light and shield the zeroth-order light.

(Supplementary Note 12)

An interface device including:

the projection system according to any one of supplementary notes 1 to 11; and a camera, wherein the controller controls the projector in such a way as to display, display information, based on a result of analyzing image sensing data captured by the camera.

(Supplementary Note 13)

A display including:

the interface device according to supplementary note 12; and a housing including a transparent display surface containing a dispersed fluorescent body that emits light by using light projected from the projector.

(Supplementary Note 14)

The display according to supplementary note 13, wherein the camera captures the display surface and outputs image information generated by capturing display information displayed on the display surface to the controller, and the controller analyzes an operation performed on display information displayed on the display surface, based on the image information output from the camera, and controls the projector in such a way as to display, on the display surface, display information that depends on the operation.

This application is based upon and claims the benefit of priority from Japanese Patent Application No. 2016-184071, filed on Sep. 21, 2016, the disclosure of which is incorporated herein in its entirety by reference.

REFERENCE SIGNS LIST 1, 2, 3, 4 Projection system
10 Projector
11 Light source
12 Light source driving power supply
13 Spatial light modulator element
14 Modulator element driving circuit
15 Projection optical system
21, 22, 23 Reflecting mirror
201 First mirror
202 Second mirror
203 Zeroth-order light shielding unit
204, 205, 207, 208 Mirror
210 Frame
30 Controller
31 Communication circuit
32 Control condition generation circuit
33 Storage circuit
34 Light source control circuit
35 Modulator element control circuit
50 Interface device
51 Projector
53 Image sensor
55 Controller
60 Display
531 Image sensing element
533 Image processor
535 Internal memory
537 Data output circuit
551 Image sensing control circuit
553 Image sensing data analysis circuit
555 Projection condition setting circuit
557 Projection control circuit
610 Projector
620 Reflecting mirror
630 Display surface
653 Camera

The invention claimed is:

1. A projection system comprising:
a projector including:
a light source;
a phase-modulation-type spatial light modulator element configured to include a display part displaying a pattern corresponding to display information, and modulate and emit light radiated on the display part from the light source; and
an optical system configured to project modulated light emitted from the spatial light modulator element;

a controller configured to generate a control condition for controlling the light source and the spatial light modulator element using a display condition acquired from a host system; and a reflecting mirror including a plurality of mirrors configured to reflect projected light from the projector toward a plurality of display areas on a plurality of projection surfaces located at different positions and in different directions, wherein the controller is configured to control the light source and the spatial light modulator element using the generated control condition, and wherein each of the reflecting surfaces of the plurality of mirrors is configured to be arranged facing toward different display areas located on different surfaces that are not parallel to each other without interposing other mirrors.

2. The projection system according to claim 1, wherein the reflecting mirror includes:

a first mirror configured to reflect projected light toward a first display area; and a second mirror configured to reflect projected light toward a second display area.

3. The projection system according to claim 2, wherein the projector is configured to project a part of projected light toward a position where the first mirror and the second mirror are not placed, and wherein the reflecting mirror is configured to pass, toward a third display area, at least a part of projected light projected toward a position where the first mirror and the second mirror are not placed.

4. The projection system according to claim 3, wherein the reflecting mirror includes a frame having an opening configured to pass light projected on the third display area.

5. The projection system according to claim 2, wherein the second mirror is divided in such a way as to reflect projected light in different directions.

6. The projection system according to claim 2, wherein at least one of the first mirror and the second mirror is a concave mirror.

7. The projection system according to claim 2, wherein at least one of the first mirror and the second mirror is a convex mirror.

8. The projection system according to claim 5, wherein at least one of the first mirror and the second mirror includes an aspherical reflecting surface.

9. The projection system according to claim 8, wherein at least one of the first mirror and the second mirror includes a freeform reflecting surface.

10. The projection system according to claim 2, wherein the reflecting mirror includes a third mirror that reflects projected light toward a display area different from the first display area and the second display area.

11. The projection system according to claim 1, wherein the reflecting mirror includes a zeroth-order light shield configured to be placed at a position irradiated with zeroth-order light contained in projected light and shield the zeroth-order light.

12. An interface device comprising:

the projection system according to claim 1; and a camera, wherein the controller controls the projector in such a way as to display, display information, using a result of analyzing image sensing data captured by the camera.

13. A display comprising:

the interface device according to claim 12; and a housing including a transparent display surface containing a dispersed fluorescent body that emits light by using light projected from the projector.

14. The display according to claim 13, wherein the camera captures the display surface and outputs image information generated by capturing display information displayed on the display surface, to the controller, and the controller analyzes an operation performed on display information displayed on the display surface, using the image information output from the camera, and controls the projector in such a way as to display, on the display surface, display information that depends on the operation.

* * * * *